US010087075B2

United States Patent
Nakayama et al.

(10) Patent No.: US 10,087,075 B2
(45) Date of Patent: Oct. 2, 2018

(54) PARTIALLY CYCLIZED POLYACRYLONITRILE POLYMER, POLYACRYLONITRILE FLAME-RESISTANT POLYMER, POLYACRYLONITRILE FLAME-RESISTANT FIBER, CARBON FIBER, AND PREPARATION METHODS THEREOF

(71) Applicant: Mitsubishi Chemical Corporation, Tokyo (JP)

(72) Inventors: Hikaru Nakayama, Hiroshima (JP); Teruyuki Yamada, Hiroshima (JP); Tomoyuki Kotani, Hiroshima (JP); Keiichi Sakashita, Hiroshima (JP)

(73) Assignee: Mitsubishi Chemical Corporation, Tokyo (JP)

( * ) Notice: Subject to any disclaimer, the term of this patent is extended or adjusted under 35 U.S.C. 154(b) by 428 days.

(21) Appl. No.: 14/672,248

(22) Filed: Mar. 30, 2015

(65) Prior Publication Data
US 2016/0376151 A1    Dec. 29, 2016

(51) Int. Cl.
| *C01B 31/02* | (2006.01) |
| *C08F 220/46* | (2006.01) |
| *C08J 3/00* | (2006.01) |
| *C08J 5/00* | (2006.01) |
| *D01F 9/22* | (2006.01) |
| *C09K 21/14* | (2006.01) |
| *D01F 1/07* | (2006.01) |
| *D01F 6/38* | (2006.01) |
| *C01B 32/05* | (2017.01) |

(52) U.S. Cl.
CPC ............. *C01B 31/02* (2013.01); *C01B 32/05* (2017.08); *C08F 220/46* (2013.01); *C08J 3/00* (2013.01); *C08J 5/00* (2013.01); *C09K 21/14* (2013.01); *D01F 1/07* (2013.01); *D01F 6/38* (2013.01); *D01F 9/22* (2013.01); *C08J 2333/20* (2013.01)

(58) Field of Classification Search
CPC ..... D01F 1/07; D01F 6/38; D01F 9/22; C01B 31/02; C08F 220/46; C08J 5/00; C08J 3/00; C08J 2333/20; C09K 21/14
See application file for complete search history.

(56) References Cited

FOREIGN PATENT DOCUMENTS

| JP | S58-109625 | 6/1983 |
| JP | S62-57723 | 12/1987 |
| JP | S63-14093 | 3/1988 |
| JP | 2004-300600 | 10/2004 |
| WO | 2007/018136 | 2/2007 |

OTHER PUBLICATIONS

Definition of degenerate, accessed online at: https://www.merriam-webster.com/dictionary/degenerating?utm_campaign=sd&utm_medium=serp&utm_source=jsonld on Jun. 11, 2017.*

N.A. Kubasova, M.V. Shishkina, N.F. Zaliznaya, M.A. Geiderikh, "Thermal Conversion of Polyacrylonitrile (PAN) in Solution", Polymer Science (USSR), 1968, p. 1537-p. 1542, vol. 10, Elsevier B.V.

Wen-Yen Chiang, Chun-Min Hu, "Studies of reactions with polymers. VI. The modification of PAN with primary amines", Journal of Polymer Science, Part A: Polymer Chemistry(J. Polym. Sci. Part A : Polym. Chem.), May 1990, p. 1623-p. 1636, vol. 28, John Wiley & Sons Inc.

* cited by examiner

*Primary Examiner* — Daniel C McCracken
(74) *Attorney, Agent, or Firm* — JCIPRNET

(57) ABSTRACT

A high-quality flame-resistant fiber and carbon fiber at low costs in preparing a flame-resistant fiber and a carbon fiber by efficiently performing a flame retardation process in a short time as compared with a conventional technology are described. [1] If a polyacrylonitrile (PAN) polymer is degenerated with an oxidizing agent containing a thiolate compound and a nitrogen atom in a polymer, and the degenerated polymer is formed into threads so as to prepare a flame-resistant PAN fiber. [2] A flame-resistant PAN fiber is prepared by degenerating a PAN precursor fiber in a solution including a thiolate compound and an oxidizing agent containing a nitrogen atom. The flame-resistant PAN fiber obtained by the preparation method is heated at 300° C. or more to 3000° C. or less, and, thus, a carbon fiber having an excellent mechanical strength can be obtained.

25 Claims, 1 Drawing Sheet

PARTIALLY CYCLIZED POLYACRYLONITRILE POLYMER, POLYACRYLONITRILE FLAME-RESISTANT POLYMER, POLYACRYLONITRILE FLAME-RESISTANT FIBER, CARBON FIBER, AND PREPARATION METHODS THEREOF

TECHNICAL FIELD

The present invention relates to a polyacrylonitrile partially cyclized polymer, a polyacrylonitrile flame-resistant polymer, a polyacrylonitrile flame-resistant fiber, a carbon fiber, and preparation methods thereof.

BACKGROUND ART

Since a flame-resistant fiber is excellent in heat resistance and flame resistance, it is widely utilized, for example, in a spatter sheet for protecting a human body from high-heat iron powder or a welding spark scattered at welding work and in a flameproof heat insulating material of an aircraft, and a demand for the flame-resistant fiber in those fields is increasing. In addition, the flame-resistant fiber is also important as an intermediate raw material for obtaining a carbon fiber. The carbon fiber is widely used in various utilities, for example, aviation/space aeronautical materials such as aircrafts and rockets, and sports goods such as golf shafts and fishing rods because of excellent dynamical properties, various chemical properties and lightness.

Furthermore, the carbon fiber has been recently employed in aircraft and automobile applications as well as general industrial applications such as for civil engineering, construction, pressure container and windmill blade, because of lightness, excellent mechanical properties and chemical properties of the carbon fiber.

In particular, a polyacrylonitrile (hereinafter, abbreviated to "PAN") carbon fiber has been actively industrialized up to now due to productivity or excellent properties and quality of the carbon fiber. The PAN carbon fiber is generally obtained by subjecting a PAN precursor fiber to a flame-resistant reaction, in which the PAN precursor is heated at a temperature of 200 to 300° C. in air, so as to obtain a flame-resistant fiber, and then subjecting the flame-resistant fiber to a carbonization reaction in which the flame-resistant fiber is heated in an inert atmosphere such as nitrogen.

However, the flame-resistant reaction is an exothermal reaction in a fiber form, that is, in a solid phase state. Thus, heat is likely to be stored in the fiber, and if the flame-resistant reaction is out of the condition in which the flame-resistant reaction is stably carried out, the flame-resistant reaction becomes out of control and the carbon fiber may be damaged.

For this reason, in a process for flame retarding a PAN carbon fiber, it generally takes a long time to strictly control a process speed of a flame-resistant reaction, thereby slowly carrying out the flame-resistant reaction. However, it cannot be said that this is a sufficiently high productive process.

As a means for solving the above-described technical problem, a method for obtaining a flame-resistant fiber by flame retarding a PAN polymer and then forming the PAN polymer into a fiber or a method for obtaining a flame-resistant fiber by forming a PAN polymer into a fiber and then flame retarding the fiber has been considered.

As an example of the method for obtaining a flame-resistant fiber by flame retarding a PAN polymer and then forming the PAN polymer into a fiber, Patent Document 1 discloses a method in which acrylonitrile (hereinafter, abbreviated to "AN") polymer powder is heated in an inert atmosphere to have a density of 1.20 g/cm$^3$ or more and then dissolved in a solvent so as to be formed into a fiber and such a fibrous material is heated. However, in this method, the AN polymer powder which is not sufficiently flame retarded is used, and, thus, there is a great change in viscosity of the solution according to time and threads are likely to be broken. Further, a strongly acidic solvent, such as sulfuric acid, acetic acid, or the like, which can easily decompose an organic polymer is used as a solvent, and, thus, it is necessary to use an apparatus formed of a special material having corrosion resistance, which causes a problem in view of cost.

Further, Patent Document 2 discloses a method in which heated AN polymer powder and non-heated AN polymer powder are mixed and then dissolved in an acidic solvent. However, in this method, the same problems, that is, corrosion resistance of the apparatus or instability of a solution, as those of the method disclosed in Patent Document 1 remain unsolved.

Meanwhile, as a method for heating PAN in a solution, Non-Patent Document 1 discloses a method in which PAN is converted into a polymer having a cyclic structure by heating a dimethylformamide (hereinafter, abbreviated to "DMF") solution of the PAN. However, since a polymer concentration is 0.5%, being a dilute solution, and a viscosity is too low, it is actually difficult to be shaped and molded into a fiber, and if the polymer concentration is increased, the polymer is precipitated, and, thus, the use as a solution is impossible.

Further, Non-Patent Document 2 discloses a method in which PAN is degenerated by reacting primary amine with a dimethyl sulfoxide (hereinafter, abbreviated to "DMSO") solution of the PAN. However, this solution is provided to impart a hydrophilic property to the PAN which is not yet flame retarded.

Furthermore, Patent Document 3 discloses a method in which a DMSO solution of PAN is degenerated by a nucleophilic agent such as amine and further oxidized with an oxidizing agent so as to prepare a flame-resistant polymer. However, in preparing a flame-resistant polymer using this method, it can be seen that as flame retardation progresses, the viscosity of the solution decreases and the viscosity of the solution changes according to time, which cause instability in a spinnability in a subsequent thread-forming process, deterioration in property of obtainable flame-resistant fiber and carbon fiber, and imbalance in property between single fibers of a fiber assembly. Further, since a nitrogen-based or quinone-based compound is used as the oxidizing agent, by-products such as amine or alcohol produced from the reaction may make an undesired reaction with the flame-resistant polymer, which causes coloration of a coagulation bath in the thread-forming process.

Meanwhile, as the method for obtaining a flame-resistant fiber by forming a PAN polymer into a fiber and then flame retarding the fiber, Patent Document 4 discloses a method in which a flame-resistant fiber is prepared by treating a PAN precursor fiber with a chemical, and suggests an organic nucleophilic reagent representing an amine-based compound as a cyclization accelerator and an organic nitrogen compound representing a nitrogen-based compound as an oxidizing agent. However, in the method disclosed in Patent Document 4, the chemical cannot permeate into the precursor fiber and the flame retardation slowly progresses, and, thus, the flame retardation process requires a certain time. Therefore, this method fails to reach industrial production.

Further, Patent Document 5 discloses a method in which elemental sulfur is contained in a PAN precursor fiber and a heat treatment is performed thereto in order to solve conformational heterogeneity in a cross sectional direction of a carbon fiber caused by lack of oxygen diffusion. However, the method disclosed in Patent Document 5 fails to reach industrial production due to a problem of stability in thread formation and a problem of generation of a reducing material during calcination.

CITATION LIST

Patent Document

Patent Document 1: JP 1988-14093 B
Patent Document 2: JP 1987-57723 B
Patent Document 3: WO 2007/018136 A
Patent Document 4: JP 2004-300600 A
Patent Document 5: JP 1983-109625 A Non-Patent Document Non-Patent Document 1: "Polymer Science (USSR)" (Polym. Sci. USSR), 1968, Vol. 10, p. 1537
Non-Patent Document 2: "Journal of Polymer Science, Part A: Polymer Chemistry" (J. Polym. Sci. Part A: Polym. Chem.), 1990, Vol. 28, p. 1623

SUMMARY OF THE INVENTION

Problem to be Solved by the Invention

In the above-described conventional method for obtaining a fiber by preparing a flame-resistant polymer in a solution and then forming the polymer into a fiber, it is deemed that since a molecular weight of the polymer decreases as the flame retardation progresses, a viscosity decreases and a drawing property decreases in the thread-forming process.

Meanwhile, the method in which a thread is formed and then flame retarded is not suitable for industrial production since it is difficult to treat the fiber in amine-based compounds known up to now or elemental sulfur in a uniform manner, the flame retardation process requires a certain time, and stability in thread formation deteriorates.

In view of the foregoing, the invention provides a preparation method of a high-quality flame-resistant fiber with a high productivity, thereby stably preparing a high-quality carbon fiber with a high productivity.

Means for Solving Problem

The invention has the following aspect.

The invention relates to a preparation method of a polyacrylonitrile flame-resistant fiber. The flame-resistant fiber mainly contains a compound formed by degenerating a polyacrylonitrile polymer with a thiolate compound and has a specific gravity of 1.24 or more to 1.55 or less.

The degeneration may be carried out in the presence of an oxidizing agent.

Further, the degeneration may be carried out in a solution, and preferably, the solution may be a non-protonic polar solvent.

The invention relates to a preparation method of a polyacrylonitrile flame-resistant fiber by mixing and dissolving a compound formed by degenerating a polyacrylonitrile polymer with a thiolate compound in a non-protonic polar solvent to form a spinning dope and obtaining the polyacrylonitrile flame-resistant fiber from the spinning dope by wet spinning method or dry-wet spinning method.

The thiolate compound is a compound selected from the following general formula (1) or (2).

[Chemical Formula 1]

In the formula (1), $M_1$ represents an alkali metal, and $R_1$ is selected from a hydrocarbon group or a hydrocarbon group containing at least one functional group selected from a hydroxy group, an amino group, a nitro group, a thiol group, an imino group, a nitrile group, and an azo group.

[Chemical Formula 2]

In the formula (2), $M_2$ represents an alkali earth metal, $R_2$ and $R_3$ are selected from a hydrocarbon group or a hydrocarbon group containing at least one functional group selected from a hydroxy group, an amino group, a nitro group, a thiol group, an imino group, a nitrile group, and an azo group.

The oxidizing agent may be preferably a compound containing at least one nitrogen atom, and more preferably a compound having at least one functional group or structure selected from the group consisting of a nitro group, a nitroso group, an N-hydroxy structure, an N-oxide structure, and an N-oxyl structure.

The invention relates to a polyacrylonitrile flame-resistant fiber obtained by the above-described preparation method.

Further, the invention relates to a partially cyclized polyacrylonitrile polymer which can be obtained by degenerating a polyacrylonitrile polymer. The partially cyclized polyacrylonitrile polymer has $Abs_{2240\pm60}$ of 70% or less as calculated according to the following formula (1) in an infrared absorption spectrum A in a range of $2240\pm60$ cm$^{-1}$ measured by infrared spectroscopy, and has a sulfur content of 0.3% by mass or more to 20.0% by mass or less.

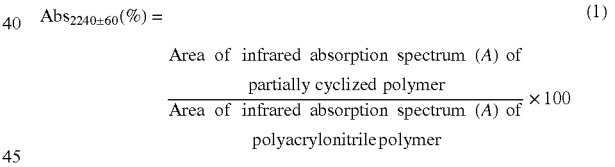

The invention relates is a preparation method of the partially cyclized polyacrylonitrile polymer and relates to a preparation method of a partially cyclized polyacrylonitrile polymer by degenerating a polyacrylonitrile polymer with a thiolate compound.

The invention is a preparation method of the polyacrylonitrile flame-resistant polymer and relates to a preparation method of a polyacrylonitrile flame-resistant polymer by oxidizing and degenerating a partially cyclized polyacrylonitrile polymer with an oxidizing agent. Preferably, the oxidizing agent may be a palladium- or palladium-containing compound.

Further, the invention is a preparation method of a carbon fiber by heating a polyacrylonitrile flame-resistant fiber at 300° C. or more to 3000° C. or less, and the polyacrylonitrile flame-resistant fiber mainly contains a compound formed by degenerating a polyacrylonitrile polymer with a thiolate compound and has a specific gravity of 1.24 or more to 1.55 or less.

In the above-described preparation method, the polyacrylonitrile flame-resistant fiber mainly contains a compound formed by a polyacrylonitrile precursor fiber with a thiolate compound and an oxidizing agent. The degeneration may be carried out in a solution, and preferably, the solution may be an ethylene glycol solvent.

In the above-described preparation method, the degeneration may be carried out in a solution including a solvent in an amount of 100 parts by mass and a thiolate compound in an amount of 1 part by mass or more to 150 parts by mass or less at 120° C. or more to 250° C. or less for 30 seconds or more to 120 minutes or less.

Otherwise, in the above-described preparation method, the degeneration may be carried out in a solution including a solvent in an amount of 100 parts by mass, a thiolate compound in an amount of 1 part by mass or more to 150 parts by mass or less, and an oxidizing agent in an amount of 1 part by mass or more to 150 parts by mass or less at 120° C. or more to 250° C. or less for 30 seconds or more to 120 minutes or less.

Further, the invention relates to a polyacrylonitrile flame-resistant fiber satisfying the following conditions (1) to (3):
(1) A sulfur content is in a range of 0.3% by mass or more to 30.0% by mass or less;
(2) A specific gravity is in a range of 1.24 or more to 1.55 or less; and
(3) A ratio ($I_a/I_b$) of a peak height $I_a$ in a range of 35 to 45 ppm to a peak height $I_b$ in a range of 25 to 35 ppm according to solid 13C-NMR is 0.5 or more.

The invention relates to a polyacrylonitrile flame-resistant polymer satisfying the following conditions (4) to (6):
(4) A sulfur content is in a range of 0.3% by mass or more to 20.0% by mass or less;
(5) A specific gravity is 1.26 or more; and
(6) A ratio ($I_a/I_b$) of a peak height $I_a$ in a range of 35 to 45 ppm to a peak height $I_b$ in a range of 25 to 35 ppm according to solid 13C-NMR is 0.5 or more.

Effect of the Invention

According to the invention, it is possible to stably prepare high-performance flame-resistant fiber and carbon fiber.

DESCRIPTION OF THE EMBODIMENTS

Figure 1:
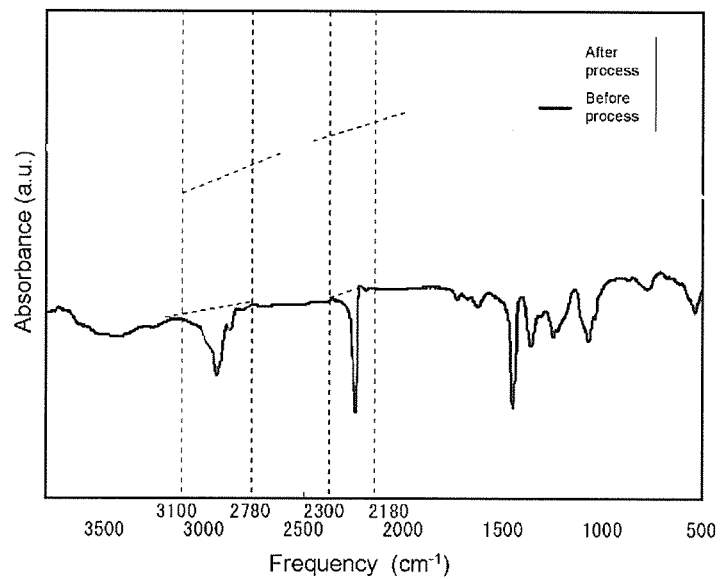
FIG. 1 illustrates infrared absorption spectra before and after a PAN precursor fiber is degenerated with thiolate (Example 1)
Figure 2:
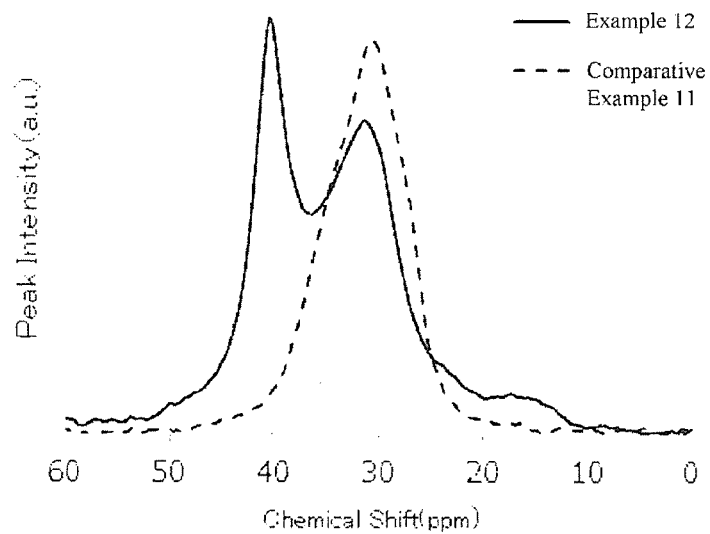
FIG. 2 illustrates solid $^{13}$C-NMR spectra of a Flame-retardant PAN fiber after a PAN precursor fiber is degenerated with thiolate (Example 12) and a Flame-retardant PAN fiber after a heat treatment at a reaction temperature of 200° C. for 120 minutes in air (Comparative Example 11).

A flame-resistant fiber used in a preparation method of a carbon fiber of the invention is prepared by the following two methods, that is, [1] a method for preparing a flame-resistant fiber by degenerating a PAN polymer in a solution and then forming the PAN polymer into a fiber or [2] a method for preparing a flame-resistant fiber by degenerating a PAN precursor fiber in a solution including a thiolate compound. Hereinafter, the methods will be described in sequence. [1] Method for preparing flame-resistant fiber by degenerating PAN polymer in solution and then forming PAN polymer into threads.

[Partially Cyclized PAN Polymer]

A partially cyclized PAN polymer (hereinafter, sometimes referred to as "partially cyclized polymer") of the invention is obtained by degenerating a polyacrylonitrile polymer. In an area of an infrared absorption spectrum A in a range of $2240\pm60$ cm$^{-1}$ measured on the PAN polymer and the degenerated partially cyclized polymer by infrared spectroscopy, $Abs_{2240\pm60}$ calculated according to the following formula (1) is 70% or less, and a sulfur content is in a range of 0.3% by mass or more to 20.0% by mass or less.

$$Abs_{2240\pm60}(\%) = \frac{\text{Area of infrared absorption spectrum (A) of partially cyclized polymer}}{\text{Area of infrared absorption spectrum (A) of polyacrylonitrile polymer}} \times 100 \quad (1)$$

The partially cyclized polymer of the invention is a polymer obtained by degenerating the PAN polymer as a precursor thereof and thus cyclizing a nitrile group as a side chain of PAN in whole or in part.

The partially cyclized polymer of the invention has $Abs_{2240\pm60}$ of 70% or less. When $Abs_{2240\pm60}$ is 70% or less, it is likely to be degenerated into a flame-resistant polymer to be described later. $Abs_{2240\pm60}$ may be preferably 50% or less, and more preferably 30% or less. The lower limit is not particularly limited, and may be 0%. Further, the infrared spectroscopy measurement is carried out by a method to be described later.

The partially cyclized polymer of the invention has a sulfur content in a range of 0.3% by mass or more to 20.0% by mass or less. When the sulfur content is 0.3% by mass or more, the effect of the invention is likely to be achieved. Further, when the sulfur content is 20.0% by mass or less, an extreme decrease in carbonization yield can be suppressed. The sulfur content may be preferably in a range of 1.0% by mass or more to 18.0% by mass or less, and more preferably in a range of 5.0% by mass or more to 15.0% by mass or less. Further, the measurement of the sulfur content in the invention is carried out by a method to be described later.

Preferably, the partially cyclized polymer of the invention may have a number average molecular weight in a range of 100,000 or more to 1,000,000 or less. When the number average molecular weight is 100,000 or more, it is possible to stably form a fiber in a thread-forming process. When the number average molecular weight is 1,000,000 or less, solubility is satisfactory. The number average molecular weight may be more preferably in a range of 100,000 or more to 500,000 or less, and still more preferably 150,000 or more to 300,000 or less.

Further, the number average molecular weight in the invention is a value measured by gel permeation chromatography (GPC). The number average molecular weight is a value expressed by the following formula:

Number average molecular weight(Mn)=Σ(NiMi)/Σ(Ni)

where Ni is the number of polymers having a molecular weight Mi. The number average molecular weight polystyrene is a relative value in terms of polystyrene.

In the invention, as a precursor polymer, a PAN polymer having a structure derived from acrylonitrile (hereinafter, sometimes referred to as "AN") in terms of easiness in flame retardation and solubility is used.

If the PAN polymer is a copolymer, the PAN polymer includes structural units derived from AN in terms of solubility and reactivity in an amount of preferably 85 mol % or more, more preferably 90 mol % or more, and still more preferably 92 mol % or more. A method for synthesizing the PAN polymer is not particularly limited, and may include, for example, a solution polymerization method, a suspension polymerization method, a slurry polymerization method, an emulsion polymerization method, or the like.

Copolymerization components for the PAN polymer may include, for example, allyl sulfonic acid metal salt, methallyl sulfonic acid metal salt, acrylic acid ester, methacrylic acid ester, acryl amide, or the like. Further, in addition to the above-described copolymerization components, as components for promoting flame retardation, compounds containing a vinyl group may be copolymerized. These compounds may include, for example, acrylic acid, methacrylic acid, itaconic acid, or the like. A part or all of these compounds may be neutralized with an alkaline component such as ammonia. The number average molecular weight of the PAN polymer is not particularly limited and may be in a range of, for example, 1,000 to 1,000,000.

[Flame-Resistant PAN Polymer]

A Flame-resistant PAN polymer (hereinafter, sometimes referred to as "flame-resistant polymer") of the invention is obtained by further degenerating the partially cyclized PAN polymer with an oxidizing agent. The flame-resistant polymer has $Abs_{2940\pm160}$ calculated according to the following formula (2) is 70% or less in an area of an infrared absorption spectrum B in a range of 2940±160 cm$^{-1}$ measured by infrared spectroscopy, and has a sulfur content in a range of 0.3% by mass or more to 20.0% by mass or less and a specific gravity of 1.26 or more.

$$Abs_{2940\pm160}(\%) = \frac{\text{Area of infrared absorption spectrum } (B)\text{ of flame-retardant polymer}}{\text{Area of infrared absorption spectrum } (B)\text{ of partially cyclized polymer}} \times 100 \quad (2)$$

The flame-resistant polymer of the invention is a polymer obtained by degenerating the partially cyclized polymer of the invention with an oxidizing agent.

The flame-resistant polymer of the invention has $Abs_{2940\pm160}$ of 70% or less. When $Abs_{2940\pm160}$ is 70% or less, the improvement in flame retardance can be observed. $Abs_{290\pm160}$ may be preferably 50% or less, and more preferably 30% or less. The lower limit is not particularly limited, and may be 0%. Further, the infrared spectroscopy measurement is carried out by a method to be described later.

The flame-resistant polymer of the invention has a sulfur content in a range of 0.3% by mass or more to 20.0% by mass or less. When the sulfur content is 0.3% by mass or more, the effect of the invention is likely to be achieved. Further, when the sulfur content is 20.0% by mass or less, an extreme decrease in carbonization yield can be suppressed. The sulfur content may be preferably in a range of 1.0% by mass or more to 18.0% by mass or less, and more preferably in a range of 5.0% by mass or more to 15.0% by mass or less.

The flame-resistant polymer of the invention has a specific gravity of 1.26 or more. When the specific gravity is 1.26 or more, the obvious improvement in flame retardance can be observed. The specific gravity may be preferably 1.28 or more, and more preferably 1.30 or more. The upper limit is not particularly limited, and may be, for example, 1.50 or less. Further, the measurement of the specific gravity in the invention is carried out by a method to be described later.

Further, in the flame-resistant polymer of the invention, a ratio $(I_a/I_b)$ of a peak height $I_a$ in a range of 35 to 45 ppm to a peak height $I_b$ in a range of 25 to 35 ppm measured by solid $^{13}$C-NMR may be preferably 0.5 or more. When the $I_a/I_b$ is 0.5 or more, it is possible to suppress threads of the fiber from being broken in a carbonization process subsequent to the flame retardation process, and thus, it is possible to stably prepare a carbon fiber. The $I_a/I_b$ may be more preferably 0.6 or more, and still more preferably 1.0 or more. The upper limit of the $I_a/I_b$ is not particularly limited, but typically, the $I_a/I_b$ is lower than 5.0.

Preferably, the flame-resistant polymer of the invention may have a number average molecular weight in a range of 100,000 or more to 1,000,000 or less. The number average molecular weight may be more preferably in a range of 150,000 or more to 900,000 or less and still more preferably in a range of 200,000 or more to 500,000 or less in terms of a spinnability in the following thread-forming process.

Although a structure of a flame-resistant polymer using a PAN polymer as a precursor has not been completely clarified, it is understood that the flame-resistant polymer has naphthyridine ring, acridone ring and hydrogenated naphthyridine ring structures generated by a cyclization reaction or an oxidation reaction of a nitrile group, as described in the literature in which a Flame-resistant PAN fiber is analyzed ((Journal of Polymer Science, Part A: Polymer Chemistry Edition) (J. Polym. Sci. Part A: Polym. Chem. Ed.), 1986, Vol. 24, p. 3101), and in view of its structure, it is generally called as a ladder polymer. It is no problem unless flame retardance is deteriorated even though unreacted nitrile groups remain, and no problem unless solubility is deteriorated even though a cross-linking is caused by a very small quantity between the molecules of the flame-resistant polymer.

[Partially Cyclized PAN Polymer-Containing Solution]

In a partially cyclized PAN polymer-containing solution (hereinafter, sometimes referred to as "partially cyclized polymer-containing solution") of the invention, the partially cyclized PAN polymer is dissolved in a solvent at a concentration in a range of 1.0% by mass or more to 50.0% by mass or less. When the concentration is 1.0% by mass or more, the productivity in a molding process is improved. Further, when the concentration is 50.0% by mass or less, a decrease in fluidity according to the progress of gelation can be suppressed, and, thus, it becomes easy to perform a molding process. The concentration may be preferably in a range of 10.0% by mass or more to 20.0% by mass or less, and more preferably in a range of 12.0% by mass or more to 18.0% by mass or less. Herein, the concentration of the partially cyclized polymer in the partially cyclized polymer-containing solution can be obtained by the following formula.

Concentration of partially cyclized polymer (% by mass)= 100×mass of partially cyclized polymer/mass of partially cyclized polymer-containing solution Further, the mass of the partially cyclized polymer-containing solution is obtained as the mass of solids remaining after the solvent is distilled from the partially cyclized polymer-containing solution by an evaporator and the solvent is completely removed by increasing a temperature to 200° C. at a rate of 40° C./min in a nitrogen gas using a thermogravimetric analyzer (TG). Further, if a solid polymer can be separated using a proper coagulant (precipitant), the mass of the partially cyclized polymer-containing solution can be calculated directly from the mass of coagulated polymer.

The viscosity of the partially cyclized polymer-containing solution can be appropriately selected from a preferable range depending on each of shaping method, molding method, molding temperature, and kind of spinneret or metal mold of the partially cyclized polymer. However, in view of a thread-forming agent in a thread-forming process, the viscosity of the solution may be preferably 10 to 100,000 poise, more preferably 10 to 10,000 poise, and still more preferably 10 to 1,500 poise at 25° C. The viscosity is a value measured according to a method to be described later. Even if the viscosity of the solution is out of the range, it can be adjusted to a proper viscosity by heating or cooling when a thread is formed.

As a solvent for dissolving the partially cyclized polymer, a polar organic solvent may be preferable in view of solubility of the partially cyclized polymer. The polar organic solvent may be an organic solvent including a hydroxyl group, an amino group, an amide group, a sulfonyl group, a sulfone group, a mercapto group, or the like. Further, the polar organic solvent may be an organic solvent having a favorable compatibility with water.

The organic solvent may include, for example, (a) glycol-based solvents such as ethylene glycol, diethylene glycol, triethylene glycol, polyethylene glycol having a molecular weight of about 200 to about 1000, or the like, (b) non-protonic polar solvents such as dimethyl sulfoxide (DMSO), dimethylformamide (DMF), dimethylacetamide (DMAc), N-methylpyrrolidone, or the like, and (c) amine-based solvents such as monoethanolamine, diethanolamine, triethanolamine, N-aminoethyl ethanolamine, ethylenediamine, diethylenetriamine, triethylenetetramine, tetraethylenepentamine, pentaethylene hexamine, N-aminoethyl piperazine, ortho-phenylenediamine, methaphenylenediamine, paraphenylenediamine, or the like.

Further, a thiol-based solvent having a favorable compatibility with water may include, for example, mercaptoethanol, mercaptopropanol, mercaptobutanol, thioglycerol, thiodiethanol, dithiothreitol, or the like having a hydroxyl group.

As thiol having a carboxyl group with a favorable compatibility with water may include, for example, thioglycolate, ammonium thioglycolate, sodium thioglycolate, potassium thioglycolate, thiolactic acid, or the like. Further, thiol having an amino group with a favorable compatibility with water may include, for example, monoamino-substituted alkanethiol such as aminoethanethiol, aminopropanethiol, aminobutanethiol, aminopentanethiol, aminohexanethiol, or the like, and di, tri, tetra, and pentaamino-substituted alkanethiol, or the like.

These solvents may be used alone or as a mixture of two or more thereof

Among these solvents, at least one solvent selected from DMSO, DMF, and DMAc is preferable since the PAN polymer as a precursor polymer is easily dissolved and the partially cyclized polymer is coagulated in water so as to easily form a dense and hard polymer, and, thus, it is suitable for wet thread formation.

Further, if the partially cyclized polymer is soluble in water, other solvents such as water, a water-soluble solvent, or the like may be used in combination with the polar organic solvent within a range of not impairing the object of the invention. The use of water is preferable in view of relative easiness of removing a solvent during a molding process to be described later, or in view of cost or productivity.

[Flame-Retardant PAN Polymer-Containing Solution]

In a Flame-retardant PAN polymer-containing solution (hereinafter, sometimes referred to as "flame-resistant polymer-containing solution") of the invention, the Flame-retardant PAN polymer is dissolved in a solvent at a concentration in a range of 1.0% by mass or more to 50.0% by mass or less. When the concentration is 1.0% by mass or more, the productivity in a molding process is improved. Further, when the concentration is 50.0% by mass or less, a decrease in fluidity according to the progress of gelation can be suppressed, and, thus, it becomes easy to perform a molding process. The concentration may be preferably in a range of 10.0% by mass or more to 20.0% by mass or less, and more preferably in a range of 12.0% by mass or more to 18.0% by mass or less. Further, the concentration of the flame-resistant polymer in the flame-resistant polymer-containing solution can be obtained in the same manner as the concentration of the partially cyclized polymer in the partially cyclized polymer-containing solution.

The viscosity of the flame-resistant polymer-containing solution can be appropriately selected depending on each of shaping method, molding method, molding temperature, and kind of spinneret or metal mold of the flame-resistant polymer. However, in view of a thread-forming agent in a thread-forming process, the viscosity of the solution may be preferably 10 to 100,000 poise, more preferably 10 to 10,000 poise, and still more preferably 10 to 1,500 poise at 25° C. The viscosity is a value measured according to a method to be described later. Even if the viscosity of the solution is out of the range, it can be adjusted to a proper viscosity by heating or cooling when a thread is formed.

As a solvent for dissolving the flame-resistant polymer, the same solvent as the solvent for dissolving the partially cyclized polymer may be used. Further, if a water is used as a solvent in addition to the polar organic solvent, an amount of water added may be preferably 5 parts by mass or more to 300 parts by mass or less, more preferably 10 parts by mass or more to 200 parts by mass or less, and still more preferably 20 parts by mass or more to 150 parts by mass or less with respect to 100 parts by mass of the flame-resistant polymer.

[Preparation Method of Partially Cyclized PAN Polymer]

The partially cyclized PAN polymer of the invention can be prepared by degeneration using a thiolate compound.

The thiolate compound may include any one as long as it is present as a thiolate in a reaction system, and may be in the form of thiol or thiolate when being handled. The thiol may include, for example, alkyl thiol such as alkyl mercaptans including methyl mercaptan, etyl mercaptan, propyl mercaptan, butyl mercaptane, pentyl mercaptan, hexyl mercaptan, heptyl mercaptan, octyl mercaptan, or the like, and structural isomers thereof; thiol having a hydroxyl group such as mercaptoethanol, mercaptopropanol, mercaptobutanol, thioglycerol, thiodiethanol, dithiothreitol, or the like; thiol having a carboxyl group such as thioglycolate, ammonium thioglycolate, sodium thioglycolate, potassium thioglycolate, thiolactic acid, or the like; thiol having an amino group such as alkanethiol substituted with a plurality of amino groups including monoamino-substituted alkanethiol such as aminoethanethiol, aminopropanethiol, aminobutanethiol, aminopentanethiol, aminohexanethiol, aminoheptanethiol, aminooctanethiol, or the like and di, tri, tetra, pentaamino-substituted alkanethiol; and thiol having a benzene ring such as benzenethiol or its derivative or an aromatic ring of a heterocyclic system.

The thiolate compound can be easily prepared by making a reaction between thiol and metal hydroxide or the like.

Preferably, the preparation may be carried out in a nitrogen atmosphere in view of suppression of a side reaction. As thiol used at this time, the above-described thiol may be used. Further, it is deemed that thiolate is present in the form of lithium salt, sodium salt, potassium salt, or ammonium salt, and preferably, it may be present in the form of sodium salt or potassium salt in view of easiness in preparation and cost.

Preferably, the thiolate compound may include other functional groups having an element such as oxygen, nitrogen, sulfur, or the like than the thiolate group. The functional group may include, for example, a hydroxyl group. Preferably, the thiolate compound may be a compound having a thiolate group and two or more functional groups including the other functional groups than the thiolate group in view of solubility of the partially cyclized polymer and the flame-resistant polymer. These thiolate compounds may be used alone or as a mixture of two or more thereof. Further, if the thiolate compound has, for example, a hydroxyl group as the other functional group than the thiolate group, the thiolate compound may be degenerated by the hydroxyl group.

When the degeneration is carried out using a thiolate compound in an amount of 10 to 250 parts by mass with respect to 100 parts by mass of a PAN polymer at 80° C. or more to 300° C. or less for 5 minutes or more to 240 minutes or less, flame retardation can be effectively achieved. The thiolate compound may be used more preferably in an amount of 20 to 200 parts by mass and still more preferably in an amount of 40 to 150 parts by mass with respect to 100 parts by mass of the PAN polymer. Further, when the temperature at the time of degeneration (degeneration temperature) is in a range of 80° C. or more to 300° C. or less, a flame retardation reaction is carried out. The degeneration temperature may be more preferably in a range of 100° C. or more to 250° C. or less and still more preferably in a range of 120° C. or more to 200° C. or less. Further, when a degeneration time is in a range of 5 minutes or more to 240 minutes or less, a proper process can be performed. The degeneration time may be more preferably in a range of 10 minutes or more to 200 minutes or less and still more preferably in a range of 30 minutes or more to 180 minutes or less.

As used herein, the state in which the PAN polymer is "degenerated" by the thiolate compound refers to a state in which the PAN polymer is affected by the thiolate compound and a cyclization reaction or an oxidation reaction of a nitrile group occurs, so that a flame-resistant structure is formed in a structure of the same polymer. The flame-resistant structure may include, for example, a structure of naphthyridine ring, acridone ring or hydrogenated naphthyridine ring.

Whether or not the flame-resistant structure is formed can be checked by a specific gravity, a sulfur content, and a mass increase of the degenerated polymer (partially cyclized polymer), or values calculated from the areas of specific peaks measured by an infrared absorption spectrum method (IR method) on the polymer before and after degeneration.

According to the IR method, in a spectrum of a partially cyclized polymer degenerated by a thiolate compound as compared with a spectrum of a polymer before degeneration, a portion derived from the thiolate compound used herein is added as a new spectrum.

According to the mass increasing method, the mass of the partially cyclized polymer is increased as compared with the PAN polymer due to degeneration by the thiolate compound. Such an increase in mass may be preferably 1.1 times or more to 3.0 times or less as compared with the mass of the PAN polymer. If the increase in mass is 1.1 times or more, the partially cyclized polymer can be sufficiently dissolved and it is possible to prevent a polymer component from being contained when a flame-resistant fiber or a carbon molded product is prepared. If the increase in mass is 3.0 times or more, flame retardance of an obtainable flame-resistant fiber can be improved. The increase in mass may be more preferably 1.3 times or more to 2.6 times or less and still more preferably 1.3 times or more to 2.2 times or less with respect to the mass of the PAN polymer.

[Preparation Method of Flame-Resistant PAN Polymer]

The flame-resistant PAN polymer of the invention can be oxidized (degenerated) using an oxidizing agent in addition to a nucleophilic agent in view of sufficiently flame retarding the partially cyclized PAN polymer. The oxidizing agent may be added after the nucleophilic agent is added, or the nucleophilic agent and the oxidizing agent may be added at the same time. If the nucleophilic agent and the oxidizing agent are added at the same time, the nucleophilic agent and the oxidizing agent may be mixed with each other before a PAN polymer is added, or the PAN polymer, the nucleophilic agent, and the oxidizing agent may be mixed together at the same time.

As the oxidizing agent, an organic or inorganic oxidizing agent may be used. The oxidizing agent may include, for example, quinone-based substances such as benzoquinone or chloranil, nitro-based substances such as nitrobenzene, inorganic peroxides such as hydrogen peroxide or potassium superoxide, and permanganates such as potassium permanganate. Preferably, air may be supplied to a reaction system in addition to the oxidizing agent in view of increasing the efficiency in degeneration by the thiolate compound.

In the invention, preferably, the oxidizing agent may be a metal-based substance in view of reactivity. The metal-based substance may include metal-based compounds such as palladium, platinum, rhodium, ruthenium, iridium, rhenium, gold, silver, copper, iron, tungsten, nickel, cobalt, chromium, calcium, vanadium, aluminum, titanium, and zinc and alloys thereof. Further, the metal-based substance may include oxides thereof. Among them, a palladium-based substance such as palladium, palladium inclusions, or the like is preferable in view of reactivity. Preferably, the palladium-based substance may be a palladium-based substance which is not dissolved in a solution in view of easiness in a removal process to be performed later, but may be a palladium-based substance which can be solved in a solvent. The palladium-based substance may be in the form of powder or a fixed-bed. Otherwise, the palladium-based substance may be in the form of elemental palladium or may be immersed in a carrier or may form a complex.

In the invention, the palladium-based substance is mainly used as an oxidizing agent. The palladium-based substance is known as a useful oxidizing agent. Further, a technology of catalytic oxidation with a small amount of palladium is disclosed (for example, "Chemical Reviews" (Chemical Reviews), 1978, Vol. 78, p. 317). However, such an oxidation reaction using palladium is carried out to catalytically react a low-molecular weight compound with high efficiency. Therefore, it is totally different in technical idea from the invention used for preparing a flame-resistant polymer. In addition, oxidation in the invention refers to so-called dehydrogenation and also refers to introduction of oxygen in preparing a flame-resistant polymer. Whether or not the polymer is oxidized can be checked by all methods. For example, there is a method in which a peak in a range of 100 to 200 ppm in a $^{13}$C NMR spectrum or a peak intensity around 1580 cm$^{-1}$ in an IR spectrum is compared with that of a source polymer.

The oxidation process may be carried out under normal pressure, under an increased pressure, or under a decreased pressure. Preferably, the oxidation process may be carried out under normal pressure or under a decreased pressure in view of reactivity. As apparatuses used for the oxidation process, publicly known reaction vessels equipped with a stirrer, for example, mixers such as extruders or kneaders can be used alone or in combination.

If the palladium or palladium inclusion is used as the oxidizing agent, a palladium content in the oxidizing agent may be preferably 1.0% by mass or more, more preferably 5.0% by mass or more, and still more preferably 10% by mass or more in view of reactivity. The upper limit of the content is not particularly limited and may be, for example, 50% by mass or less.

The oxidation temperature may be preferably in a range of 80° C. or more to 300° C. or less, more preferably in a range of 120° C. or more to 280° C. or less, and still more preferably 160° C. or more to 250° C. or less in view of reaction efficiency. The oxidation time may be preferably 5 minutes or more to 240 minutes or less, more preferably 10 minutes or more to 220 minutes or less, and still more preferably 20 minutes or more to 180 minutes or less in view of productivity.

If the thiolate compound and the oxidizing agent are used at the same time, a dissolution process and a flame-retardation reaction can be carried out efficiently by heating a mixture solution including the PAN polymer, the thiolate compound, the oxidizing agent, and the polar organic solvent. The heating temperature is appropriately selected depending on a solvent, a thiolate compound, an oxidizing agent used herein, but may be preferably in a range of 100 to 350° C., more preferably in a range of 110 to 300° C., and still more preferably in a range of 120 to 250° C.

The preparation method of a flame-resistant polymer from the solution according to the invention can suppress a decrease in a molecular weight of the polymer caused by degeneration, as compared with a preparation method of a flame-resistant polymer from the conventional solution. Therefore, it is possible to efficiently prepare a flame-resistant polymer-containing solution having a viscosity suitable for spinning in a thread-forming process. Further, it is possible to increase a drawing ratio during spinning, and, thus, it is possible to stably prepare a high-performance flame-resistant fiber.

In addition, if the metal-based substance is used as an oxidizing agent in preparing a flame-resistant polymer, an amount of the oxidizing agent used can be reduced, as compared with a nitro-based compound or a quinone-based compound conventionally used. Further, the metal-based substance can be easily collected from the flame-resistant polymer-containing solution after the reaction is ended, and then used again.

Further, the preparation method of flame-resistant fiber and carbon fiber of the invention has the following advantage as compared with a conventional preparation method (so-called "Shindo method") using an oven.

That is, in the preparation method of flame-resistant fiber and carbon fiber according to the Shindo method, when a flame retardation process is performed to a precursor fiber having a large diameter, a degree of flame retardation on and within the fiber becomes non-uniform, and, thus, properties of the flame-resistant fiber and the carbon fiber deteriorate. However, in the preparation method of the invention, a polymer as a carbon fiber precursor is spun after being flame retarded in a solution, and, thus, it becomes easy to prepare flame-resistant fiber and carbon fiber having a uniform structure.

[Preparation of Flame-Resistant Fiber]

A flame-resistant fiber of the invention can be obtained by forming the partially cyclized polymer-containing solution or the flame-resistant polymer-containing solution (hereinafter, sometimes referred to as "polymer-containing solution") into a thread.

A specific gravity of the flame-resistant fiber of the invention may be preferably in a range of 1.24 to 1.60, more preferably in a range of 1.25 to 1.55, and sill more preferably in a range of 1.26 to 1.50. When the specific gravity is 1.24 or more, less holes within a single fiber are formed and the fiber strength is improved. When the specific gravity is 1.60 or less, the compactness becomes appropriate and flexibility is improved. The specific gravity is a value measured by a method to be described later.

A remaining amount of the solvent contained in the flame-resistant fiber may be preferably 10% by mass or less, more preferably 5% by mass or less, and still more preferably 1% by mass or less. If the remaining amount of the solvent is 10% by mass or less, flame retardance is improved.

The flame-resistant fiber of the invention can be prepared through a process of forming the polymer-containing solution into a thread and a process of removing the solvent used in the thread-forming process.

As the method of forming the polymer-containing solution into a thread, wet spinning method or dry-wet spinning method may be adopted. In these thread-forming methods, a spinning dope is introduced through a spinneret into a coagulation bath so as to be coagulated and coagulated threads are obtained. A coagulation bath solution including the solvent contained in the spinning dope and a coagulation-promoting component may be used.

If the polymer is not dissolved in water, water may be used as a coagulation-promoting component. A ratio of the solvent and the coagulation-promoting component in the coagulation bath solution and a temperature of the coagulation bath can be appropriately selected in consideration of compactness, surface smoothness, and spinnability of the obtainable coagulated threads. A fiber can be formed at a concentration of the coagulation bath in which coagulation can be carried out. For example, if water is used as a coagulation-promoting component, a ratio of solvent/water (volume ratio) may be preferably in a range of 30/70 to 70/30 and more preferably in a range of 40/60 to 60/40. Further, a temperature of the coagulation bath may be selected in a range of 0 to 100° C. depending on a purpose. As the coagulation bath solution, alcohols, such as propanol or butanol, having a low affinity for water may be used.

Then, the coagulated threads as obtained may be drawn in a drawing bath or washed in a washing bath.

Thereafter, the coagulated threads may be further dried and drawn, thereby obtaining a flame-resistant fiber.

As a drying method, a publicly known method may be adopted. A drying temperature may be in a range of 50 to 450° C. Typically, at a low temperature, the drying process is carried out for a long time, and at a high temperature, the drying method is carried out for a short time.

If the drawing process is carried out after the drying process, a specific gravity of the dried fiber may be preferably in a range of 1.15 to 1.5, more preferably in a range of 1.2 to 1.4, and still more preferably in a range of 1.2 to 1.35. Further, flexibility of a single fiber in a fiber assembly after the drying process may be preferably in a range of 0.5 to 20%. Preferably, the drawing process may be carried out by heating the fiber in a state where the fiber contains water, such as by a bath drawing method using warm water or hot water, a drawing method using steam (water vapor), or a heating drawing method in which a fiber is provided in advance with water and then drawn by a dry heating apparatus or a roller. This is because when a thiolate compound is used as a nucleophilic agent in preparing a partially cyclized polymer, a thiolate-modified flame-resistant polymer is highly plasticized by water. The inventors of the invention found this fact. It is difficult to draw and orient a fiber formed of molecules having a rigid chemical structure like the flame-resistant polymer of the invention. This is because a polymer having a rigid molecular chain generally has a high melting point or glass transition point and is often pyrolyzed without being plasticized when only a temperature is increased. However, as a result of careful consideration, the inventors of the invention found that the thiolate-modified flame-resistant polymer can be drawn with a moisture ratio in a specific range at a temperature in a specific range.

As for the flame-resistant fiber obtained by the Shindo method, molecules are randomly cross-linked due to an oxidation reaction, and, thus, it is difficult to draw the flame-resistant fiber. Meanwhile, as for the thiolate-modified flame-resistant polymer of the invention, molecules are hardly cross-linked and interactions between the flame-resistant polymer molecules are cut off, and, thus, the polymer in the flame-resistant fiber is plasticized. Therefore, the flame-resistant fiber obtained by the wet thread-forming method or the dry thread-forming method using the polymer-containing solution can be efficiently drawn in water and thus may have a high density and a high degree of orientation.

The flame-resistant fiber drawn as such may be preferably dried if necessary. A moisture ratio of the flame-resistant fiber may be preferably 10% or less and more preferably 5% or less. As the drying method, a publicly known method may be adopted.

$Abs_{2240\pm60}$ of the dried flame-resistant fiber may be preferably in a range of 10% or more to 50% or less. This $Abs_{2240\pm60}$ is a value obtained by calculating a ratio of the area of a peak of a nitrile group in the flame-resistant polymer constituting a flame-resistant fiber to the area of a peak of a nitrile group in the PAN polymer in the same manner as the $Abs_{2240\pm60}$ described above. If $Abs_{2240\pm60}$ is 10% or more, flexibility of a polymer chain of the flame-resistant polymer is secured, and, thus, it is possible to smoothly perform a drawing process. $Abs_{2240\pm60}$ may be more preferably 20% or more and still more preferably 25% or more. If $Abs_{2240\pm60}$ is 50% or less, a heating process to be performed later can be carried out at a low temperature for a short time, and, thus, a load of equipment can be reduced. $Abs_{2240\pm60}$ may be more preferably 40% or less and still more preferably 35% or less.

Preferably, the dried flame-resistant fiber may be further heated if necessary. When it is heated after the drawing process, a cross-linked structure is formed between molecular chains, and, thus, when a final product is exposed to a high temperature or a chemical, deterioration can be suppressed. The heating method is not particularly limited, and a publicly known method may be adopted. A heating temperature may be preferably in a range of 200° C. or more to 400° C. or less.

[Preparation of Carbon Fiber]

The carbon fiber of the invention can be obtained by calcining the flame-resistant fiber. To be specific, it can be obtained by heating the flame-resistant fiber at a high temperature in an inert atmosphere, that is, by performing a so-called carbonization process. For example, the carbon fiber can be obtained by heating the flame-resistant fiber in an inert atmosphere at 300° C. or more to less than 2000° C. When the obtained carbon fiber is further heated in an inert atmosphere at 2000 to 3000° C., a carbon fiber having a developed graphite structure can be obtained.

A specific gravity of the carbon fiber of the invention may be preferably in a range of 1.6 or more to 2.4 or less. If the specific gravity is 1.6 or more, it is difficult to fold the fiber, and if the specific gravity is 2.4 or less, it is possible to suppress generation of defects in the carbon fiber.

A sulfur content of the carbon fiber of the invention may be preferably in a range of 0.3% by mass or more to 20.0% by mass or less in view of strength or modulus of elasticity. The sulfur content may be more preferably in a range of 0.5% by mass or more to 18.0% by mass or less and still more preferably in a range of 1.0% by mass or more to 16.0% by mass or less.

[2] Method for Preparing Flame-Resistant Fiber by Degenerating PAN Precursor Fiber in Thiolate Compound-Containing Solution

[PAN Precursor Fiber]

The PAN precursor fiber of the invention may use a homopolymer of acrylonitrile (AN) (PAN homopolymer) or a copolymer of acrylonitrile and another monomer (PAN copolymer). (Hereinafter, the PAN homopolymer and the PAN copolymer will be adequately abbreviated to "PAN polymer".)

In order to improve a quality and performance of the carbon fiber by increasing thread-forming stability of the PAN precursor fiber, preferably, the PAN polymer may include structural units derived from AN in an amount of 90.0 mol % or more to 99.98 mol % or less. If the structural units derived from AN are too large in amount, the thread-forming stability decreases, and if the structural units derived from AN are too small in amount, flame retardance of the PAN precursor fiber decreases. Thus, in a subsequent flame retardation process, fibers are likely to be bonded to each other. More preferably, the structural units derived from AN may be included in an amount of 94.0 mol % or more to 99.9 mol %.

A monomer to be copolymerized is not particularly limited as long as it can be copolymerized with AN, and may include, for example, acrylic acid esters such as methyl acrylate, ethyl acrylate, or the like; methacrylic acid esters such as ethyl methacrylate, or the like; unsaturated monomers such as acrylic acid, methacrylic acid, maleic acid, itaconic acid, acrylamide, or the like; and methylallylsulfonic acid, allylsulfonic acid, styrene sulfonic acid and alkali metals thereof. Other monomers may be used alone or as a mixture of two or more thereof

[Preparation Method of PAN Polymer]

A polymerization method of the PAN polymer is not particularly limited, and may include a solution polymerization method, a suspension polymerization method, an emulsion polymerization method, or the like.

[Preparation of PAN Precursor Fiber]

The PAN precursor fiber used in the invention can be obtained by forming a polymer solution in which the PAN polymer is dissolved in a solvent (hereinafter, referred to as "spinning dope") into threads from a spinneret and introducing the threads into a coagulation bath so as to be coagulated by way of a publicly known method such as the wet thread-forming method or the dry thread-forming method.

As the solvent that dissolves the PAN polymer, an organic solvent or an inorganic solvent may be used. Among organic solvents, particularly, dimethyl sulfoxide (DMSO), dimethylformamide (DMF), dimethylacetamide (DMAc), N-methylpyrrolidone, and sulfolane are preferable since they dissolve PAN polymer well and have a high thread-forming stability. These solvents may be used alone or as a mixture of two or more thereof. Further, a solution in which a coagulation agent (for example, water) is contained in the solvent may be used for a coagulation bath.

After the spinning dope is formed into threads and coagulated within a coagulation bath so as to form a line of threads, a washing process, a drawing process, an oil agent applying process, and a drying process are performed to the obtained threadform, and, thus, a PAN precursor fiber can be finally obtained. In the drawing process, the line of threads obtained right after coagulation may be drawn in the drawing bath without the washing process or may be drawn in the drawing bath after the solvent is removed in the washing bath. Such a drawing process may be carried out in a single drawing bath or multiple drawing baths controlled in temperature to 30 to 98° C.

The oil agent applying process may use a method of applying an oil agent containing a silicon compound to the line of threads after the drawing process. Preferably, the silicon-based oil agent may contain amino-modified silicon having a high flame retardance.

As the drying process, a method of bring the line of threads into contact with a roller heated to 50 to 200° C. is efficient. The PAN precursor fiber after the drying process may have a moisture ratio of preferably 1.0 weight % or less.

The number of filaments per line of threads of the PAN precursor fiber bundle used in the invention may be preferably in a range of 1,000 to 300,000, more preferably in a range of 3,000 to 100,000, still more preferably 6,000 to 50,000, and particularly preferably 12,000 to 24,000.

The PAN precursor fiber used in the invention may have a single fiber fineness in a range of preferably 0.6 dtex or more to 30 dtex or less, more preferably 1.0 dtex or more to 25 dtex or less, and still more preferably 2.0 dtex or more to 20 dtex or less.

[Preparation Method of Flame-Resistant PAN Fiber]

The invention relates to a preparation method of a carbon fiber by heating a flame-resistant PAN fiber in a range of 300° C. or more to 3000° C. or less. The flame-resistant fiber is formed by degenerating a PAN polymer into a thiolate compound and has a specific gravity of 1.24 or more to 1.55 or less.

The expression "degeneration into the thiolate compound" used herein means that the PAN polymer is affected by the thiolate compound and a cyclization reaction or an oxidation reaction of a nitrile group occurs so that a flame-resistant structure is formed in a structure of the same polymer. Examples of the flame-resistant structure may include naphthyridine ring, acridone ring and hydrogenated naphthyridine ring structures.

Whether or not the flame-resistant structure is formed can be checked on the basis of a specific gravity and a sulfur content of the degenerated polymer, or values calculated from the areas of specific peaks measured by an infrared absorption spectrum method (IR) on the polymer before and after degeneration.

The PAN precursor fiber in the invention may be degenerated in a condition that a specific gravity of the flame-resistant fiber is in a range of 1.24 or more to 1.55 or less. If the specific gravity is less than 1.24, threads may be broken in a subsequent carbonization process due to lack of flame retardance, and, thus, workability deteriorates and a quality of an obtainable carbon fiber also deteriorates. If the specific gravity is more than 1.55, a quality of a carbon fiber which can be obtained by inhibiting densification in a subsequent pre-carbonization process deteriorates. The specific gravity of the flame-resistant fiber may be more preferably in a range of 1.30 or more to 1.50 or less and still more preferably in a range of 1.33 or more to 1.38 or less.

Details of the PAN polymer and the thiolate compound will be descried later.

In the invention, the flame-resistant fiber is formed by degenerating the PAN polymer into the thiolate compound.

To be specific, the PAN polymer or the PAN precursor fiber obtained by forming the PAN polymer into threads by way of a publicly known method is degenerated using the thiolate compound or the thiolate compound and an oxidizing agent. In particular, degeneration of the PAN precursor fiber is preferable since it is possible to perform a degeneration process for a short time with efficiency.

A method for degenerating the PAN precursor fiber is not particularly limited. For example, a method of allowing the precursor fiber to stay in a solution or in a gas, or a method of applying the compound to a surface of the precursor fiber may be used.

Particularly, a method of degenerating the PAN precursor fiber in a thiolate compound-containing solution or a solution containing a thiolate compound and an oxidizing agent is preferable in view of excellent easiness in operation and productivity.

[Thiolate Compound]

A thiolate compound has a high nucleophilicity and a high polarizability, and such properties enable a rapid flame retardation reaction in the invention. Further, the thiolate compound just needs to be present as thiolate in a reaction system.

The thiolate compound is a compound selected from the following general formula (1) or (2).

[Chemical Formula 1]

$$M_1\text{-S}-R_1 \quad (1)$$

(In the formula (1), M represents an alkali metal, and R is selected from the group consisting of a hydrocarbon group or an aryl group. R may contain at least one functional group selected from a hydroxy group, an amino group, a nitro group, a thiol group, an imino group, a nitrile group, and an azo group.)

[Chemical Formula 2]

$$R_2-\text{S-}M_2\text{-S}-R_3 \quad (2)$$

(In the formula (2), M represents an alkali earth metal, and R is selected from the group consisting of a hydrocarbon group or an aryl group. R may contain at least one functional group selected from a hydroxy group, an amino group, a nitro group, a thiol group, an imino group, a nitrile group, and an azo group.) Generally, the thiolate compound can be easily synthesized by mixing a thiol compound and metal hydroxide or the like and making a reaction therebetween. Preferably, the synthesis may be carried out in a nitrogen atmosphere, thereby suppressing a side reaction.

Examples of thiol used in synthesizing the thiolate may include alkyl thiols such as methyl mercaptan, etyl mercaptan, propyl mercaptan, butyl mercaptane, pentyl mercaptan, hexyl mercaptan, heptyl mercaptan, octyl mercaptan, and structural isomers thereof, thiols having a hydroxyl group such as mercaptoethanol, mercaptopropanol, mercaptobutanol, thioglycerol, thiodiethanol, dithiothreitol, or the like, thiols having a carboxyl group such as thioglycolate, ammonium thioglycolate, sodium thioglycolate, potassium thioglycolate, thiolactic acid, or the like, or mono amino-substituted alkanethiols such as aminoethanethiol, aminopropanethiol, aminobutanethiol, aminopentanethiol, aminohexanethiol, aminoheptanethiol, aminooctanethiol, or the like, and alkanethiols substituted with multiple amino groups such as diamino-substituted/triamino-substituted/tetraamino-substituted/pentaamino-substituted alkanethiols of the same type.

The thiolate compound is known to be present as alkali metallic salt or alkaline earth metallic salt. In the invention, examples of alkali metal may include lithium, sodium, and potassium, and examples of alkaline earth metal may include beryllium, magnesium, and calcium. Particularly, sodium and potassium are preferable since the raw materials are low-priced and the flame-resistant fiber of the invention is excellent in production stability.

The thiolate compound in the invention may include one or more kinds of functional groups or structures selected from the group consisting of a hydrocarbon group or an aryl group in addition to metal ions or a thiolate group. Further, preferably, the thiolate compound of the invention may include a functional group having an element such as oxygen, nitrogen, sulfur, or the like in view of improvement in reactivity with the PAN precursor fiber or solubility. To be more specific, the thiolate compound of the invention may contain at least one functional group selected from a hydroxy group, an amino group, a nitro group, a thiol group, and an azo group.

[Oxidizing Agent]

As an oxidizing agent used for the preparation method of the invention, a compound containing at least one nitrogen atom is appropriate. For example, a compound having at least one functional group selected from the group consisting of a nitro group, a nitroso group, an N-hydroxy structure, an N-oxide structure, and an N-oxyl structure since a flame retardation reaction has a high efficiency. In particular, a compound containing a nitro group is preferable since it has easiness in handling or a high oxidativity. To be more specific, aromatic nitro compounds such as nitrotoluene, nitrobenzene, nitroxylene, nitronaphthalene, nitrocatechol, aminophenol, or the like are preferable since they have excellent boiling point, solubility, or reaction efficiency.

Otherwise, a quinone-based compound or an oxidizing agent selected from the group consisting of metal oxides such as potassium permanganate, sodium permanganate, or the like may be used as the oxidizing agent.

[Flame Retardation Reaction Using Thiolate Compound and Oxidizing Agent]

A method for degenerating the PAN precursor fiber may be a batch-wise method or a continuous method of which one may be selected depending on a purpose. For example, there may be used a method in which the PAN precursor fiber is taken out of a bobbin or a fiber accommodation container and immersed in a solution so as to be continuously processed. Otherwise, there may be used a method in which the PAN precursor fiber is immersed in a solution while being wound on a bobbin or a reel so as to be processed in a batch-wise manner. A method of processing the PAN precursor fiber wound on a bobbin can simplify a system, and, thus, it is preferable in view of reduction in cost.

In the invention, if the PAN precursor fiber is degenerated in a solution containing a thiolate compound or in a solution containing a thiolate compound and an oxidizing agent, there may be used a solution in which the thiolate compound is added in an amount of 1 part by mass or more to 150 parts by mass or less with respect to 100 parts by mass of a solvent. The amount may be preferably in a range of 5 parts by mass or more to 140 parts by mass or less and more preferably in a range of 10 parts by mass or more to 130 parts by mass or less. By appropriately controlling a concentration of the thiolate compound in the solution, it is possible to uniformly perform a flame retardation process into the precursor fiber.

If the oxidizing agent is further contained, the oxidizing agent may be added in an amount of 1 part by mass or more to 150 parts by mass or less with respect to 100 parts by mass of the solvent. The amount may be preferably in a range of 10 parts by mass or more to 140 parts by mass or less and more preferably in a range of 20 parts by mass or more to 130 parts by mass or less. By appropriately controlling a concentration of the oxidizing agent, it is possible to uniformly perform a flame retardation process into the precursor fiber.

Preferably, the thiolate compound and the oxidizing agent may be used in the form of a solution while being dissolved in the solvent. If the oxidizing agent is not dissolved in the solvent, it may be used in the form of a suspension or an emulsion thereof.

As the solvent used in the invention, a polar solvent is preferable in view of solubility of the thiolate compound.

Further, a higher boiling point of the solvent is preferable. To be specific, the boiling point may be preferably 120° C. or more, more preferably 150° C. or more, and still more preferably 180° C. or more.

As the solvent, a water-soluble solvent is preferable. The solvent may have a hydroxyl group, an amino group, an amide group, a sulfonyl group, a sulfone group, a mercapto group, or the like.

To be specific, glycol-based solvents such as ethylene glycol, diethylene glycol, triethylene glycol, or the like, non-protonic polar solvents such as DMSO, DMF, DMAc, N-methyl pyrrolidone, or the like, mine-based solvents such as monoethanolamine, diethanolamine, triethanolamine, N-aminoethyl ethanolamine, ethylenediamine, diethylenetriamine, triethylenetetramine, tetraethylenepentamine, pentaethylene hexamine, N-aminoethyl piperazine, orthophenylenediamine, methaphenylenediamine, paraphenylenediamine, or the like, or water may be used. The above-described solvents may be used alone or as a mixture of two or more thereof A temperature for degenerating the PAN precursor fiber is preferably in a range of 120° C. or more to 250° C. or less in view of reactivity and more preferably in a range of 160° C. or more to 250° C. or less. If the temperature is less than 120° C., a flame retardation reaction may not be completed, and if the temperature is more than 250° C., the thiolate compound may be dimerized and a disulfide compound may be generated.

Further, the degeneration process of the PAN precursor fiber may be carried out under an increased pressure. Since the degeneration process is carried out under an increased pressure, the equivalent effect can be obtained at a lower temperature and the degeneration process can be rapidly performed into the precursor fiber, as compared with a case where the degeneration process is carried out under air pressure. The degeneration process may be preferably in a range of 0.18 MPa or more to 3.98 MPa or less. In a range of 0.11 MPa or more to less than 0.18 MPa, the effect of rapid degeneration into the precursor fiber is not sufficient, and at a pressure of more than 3.98 MPa, fibers are likely to be bonded to each other.

When the PAN precursor fiber is degenerated under the increased pressure, a commercial autoclave may be used.

If the degeneration process is carried out under the increased pressure, the solvent may be preferably an aqueous solvent, and specifically, may be water.

If the degeneration process is carried out under the increased pressure, a temperature may be in a range of 120° C. or more to 250° C. or less and a time may be in a range of 30 seconds or more to 120 minutes or less. If the temperature is less than 120° C., a flame retardation reaction may not be completed, and if the temperature is more than 250° C., the thiolate compound may be dimerized and a disulfide compound may be generated. Since the degeneration process is carried out for 30 minutes or more to 120 minutes or less, a sufficient flame retardation reaction can be carried out. Thus, a finally obtained carbon fiber has an excellent property.

The degeneration process carried out under the increased pressure needs to be carried out such that a polyacrylonitrile flame-resistant fiber has a specific gravity in a range of 1.24 or more to 1.55 or less and a sulfur content in a range of 0.1% by mass or more to 30% by mass or less.

If the specific gravity is less than 1.24, threads may be broken in a subsequent carbonization process due to lack of flame retardance, and, thus, workability deteriorates and a quality of an obtainable carbon fiber also deteriorates. If the specific gravity is more than 1.55, a quality of a carbon fiber which can be obtained by inhibiting densification in a subsequent pre-carbonization process deteriorates. The specific gravity of the flame-resistant fiber may be more preferably in a range of 1.30 or more to 1.50 or less and still more preferably in a range of 1.33 or more to 1.38 or less.

Further, if the sulfur content is less than 0.1% by mass, voids may be generated, which may cause a decrease in strength, and if the sulfur content is more than 30% by mass, modulus of elasticity may be remarkably decreased.

Preferably, the degeneration process of the PAN precursor fiber may be carried out for 30 seconds or more to 120 minutes or less. Since the degeneration process of the PAN precursor fiber is carried out for 30 seconds or more to 120 minutes or less, a sufficient flame retardation reaction can be carried out. Thus, a finally obtained carbon fiber has an excellent property. Preferably, the time may be 30 seconds or more to 60 minutes or less in view of productivity.

Preferably, the degeneration process of the PAN precursor fiber may be carried out under the condition that a sulfur content in a flame-resistant fiber is in a range of 0.30% by mass or more to 30% by mass or less. If the sulfur content is less than 0.30% by mass, a flame retardation reaction may not be sufficient and fluff may be easily generated in a carbonization process. If the sulfur content is more than 30% by mass, generation of a gas such as sulfuric trioxide or thiazole may be remarkable in a carbonization process and a carbonization yield is remarkably decreased. The sulfur content may be preferably in a range of 1.0% by mass or more to 18% by mass or less and more preferably in a range of 5.0% by mass or more to 15% by mass or less.

Further, in the present, the sulfur content and the specific gravity are measured by the methods to be described later.

The degenerated flame-resistant fiber may be washed with water or an acidic solution, and then may enter into a carbonization process. By allowing the flame-resistant fiber to pass through water or an acidic solution, metal ions (alkali metal, alkali earth metal) derived from the thiolate compound attached or bonded to the flame-resistant fiber can be removed.

[Flame-Resistant PAN Fiber]

When the flame-resistant fiber is obtained by degenerating the PAN precursor fiber using the thiolate compound or the thiolate compound and the oxidizing agent by the above-described method, preferably, the process may be carried out such that an area ratio of infrared absorption spectra measured on the PAN precursor fiber and the degenerated flame-resistant fiber by infrared spectroscopy in a range of $2240\pm60$ cm$^{-1}$ or $2940\pm160$ cm$^{-1}$, and a sulfur content and a specific gravity of the flame-resistant fiber have predetermined value ranges, respectively.

To be specific, preferably, the process may be carried out under the condition that $Abs_{2240\pm60}$ calculated from the following formula (3) using an area of an infrared absorption spectrum A measured on the flame-resistant PAN fiber obtained by the above-described method and the PAN precursor fiber by infrared spectroscopy in a range of $2240\pm60$ cm$^{-1}$ is 70% or less.

$$Abs_{2240\pm60}(\%) = \frac{\text{Area of infrared absorption spectrum } (A) \text{ of flame-retardant fiber}}{\text{Area of infrared absorption spectrum } (A) \text{ of polyacrylonitrile precursor fiber}} \times 100 \quad (3)$$

Since $Abs_{2240\pm60}$ is 70% or less, it is possible to stably prepare a carbon fiber in a carbonization process subsequent to the flame retardation process. $Abs_{2240\pm60}$ may be preferably 50% or less and more preferably 30% or less. The lower limit is not particularly limited, and may be 0%. Further, the infrared spectroscopy measurement is carried out by a method to be described later.

Further, preferably, $Abs_{2940\pm160}$ calculated from the following formula (4) using an area of an infrared absorption spectrum B measured on the flame-resistant PAN fiber obtained by the above-described method and the PAN precursor fiber by infrared spectroscopy in a range of $2940\pm160$ cm$^{-1}$ may be 70% or less. Since $Abs_{2940\pm160}$ is 70% or less, it is possible to suppress threads of the fiber from being broken in a carbonization process subsequent to the flame retardation process, and, thus, it is possible to stably prepare a carbon fiber. $Abs_{2940\pm160}$ may be preferably 50% or less and more preferably 30% or less. The lower limit is not particularly limited, and may be 0%.

$$Abs_{2940\pm160}(\%) = \frac{\text{Area of infrared absorption spectrum } (B) \text{ of polyacrylonitrile precursor fiber}}{\text{Area of infrared absorption spectrum } (B) \text{ of flame-retardant fiber}} \times 100 \quad (4)$$

Furthermore, preferably, $Abs_{2240/2940}$ calculated from the following formula (5) using an area of an infrared absorption spectrum A in a range of $2240\pm60$ cm$^{-1}$ and an area of an infrared absorption spectrum B in a range of $294\pm160$ cm$^{-1}$ measured on the flame-resistant fiber by infrared spectroscopy may be in a range of 0.05 or more to 0.60 or less. If $Abs_{2240/2940}$ is 0.05 or more, the fiber may have a sufficient flame retardance. If $Abs_{2240/2940}$ is 0.60 or less, a sufficient flame retardation reaction is carried out, and, thus, a carbonization process subsequent to the flame retardation process can be stably performed in a short time. Further, Abs$_{2240/2940}$ is 0.05 or more, it is possible to suppress damage to the fiber by performing an excessive heating process to the precursor fiber.

$$\text{Abs}_{2240/2940} = \frac{\text{Area of infrared absorption spectrum (A) of flame-retardant fiber}}{\text{Area of infrared absorption spectrum (B) of flame-retardant fiber}} \times 100 \quad (5)$$

Further, the infrared spectroscopy measurement is carried out by a method to be described later.

Furthermore, in the flame-resistant PAN fiber of the invention, a ratio ($I_a/I_b$) of a peak height $I_a$ in a range of 35 to 45 ppm to a peak height $I_b$ in a range of 25 to 35 ppm measured by solid $^{13}$C-NMR may be preferably 0.5 or more. When the $I_a/I_b$ is 0.5 or more, it is possible to suppress threads of the fiber from being broken in a carbonization process subsequent to the flame retardation process, and, thus, it is possible to stably prepare a carbon fiber. The $I_a/I_b$ may be more preferably 0.6 or more, and still more preferably 1.0 or more. The upper limit of the $I_a/I_b$ is not particularly limited, but typically, the $I_a/I_b$ is lower than 5.0.

[Preparation Method of Carbon Fiber and Carbon Fiber]

A carbon fiber of the invention can be obtained by further carbonizing the flame-resistant fiber obtained by the above-describe method. To be specific, the carbon fiber can be obtained by heating (carbonizing) the flame-resistant fiber in an inert atmosphere at a high temperature. For example, the carbon fiber can be obtained by processing the flame-resistant fiber in an inert fiber at 300° C. or more to less than 2000° C. The lower limit of the temperature may be preferably 800° C. or more, more preferably 1000° C. or more, and still more preferably 1200° C. or more. The upper limit of the temperature may be more preferably 1800° C. or less, and still more preferably 1600° C. or less. Further, when the obtained carbon fiber is further heated in an inert atmosphere at 2000° C. or more to less than 3000° C., a carbon fiber having a developed graphite structure can be obtained.

A specific gravity of the carbon fiber of the invention may be preferably in a range of 1.5 or more to 2.4 or less, more preferably in a range of 1.6 or more to 2.1 or less, and still more preferably in a range of 1.6 or more to 1.9 or less. If the specific gravity is 1.5 or more, it is likely to express a sufficient strength. If the specific gravity is 2.4 or less, it is possible to suppress generation of defects.

A sulfur content of the carbon fiber of the invention may be preferably in a range of 0.1% by mass or more to 5.0% by mass or less in view of strength or modulus of elasticity. The sulfur content may be more preferably in a range of 0.2% by mass or more to 3.0% by mass or less and still more preferably in a range of 0.3% by mass or more to 1.0% by mass or less. If the sulfur content is less than 0.1% by mass, voids may be generated, which may cause a decrease in strength, and if the sulfur content is more than 3.0% by mass, modulus of elasticity may be remarkably decreased.

[Surface Treatment of Carbon Fiber]

The carbon fiber of the invention may be electrolyzed for surface modification. As an electrolyte used in the electrolysis, acidic solutions such as sulfuric acid, acetic acid, chloric acid, or the like, and aqueous solutions of alkali such as sodium hydroxide, potassium hydroxide, tetraethylammonium hydroxide or salts thereof may be used. A quantity of electricity required for the electrolysis may be appropriately selected depending on a corresponding carbon fiber.

EXAMPLE

The invention will be described in more detail with reference to the following examples, but is not limited thereto. The properties and characteristics in the following examples are measured by the following methods.

<Degree of Swelling of Coagulated Thread>

A degree of swelling B of a coagulated thread was calculated from a mass W after adhesive water on a surface of the coagulated thread was sufficiently removed with a blotting paper and a mass WO after the resultant coagulated thread was dried at 150° C. for 1 hour with a hot air drier using the following formula.

$B(\%)=\{(W-W0)/W0\}\times100$

<Concentration of Polymer Concentrations in Partially Cyclized Polymer-Containing Solution and Flame-Resistant Polymer-Containing Solution>

When a polymer was water soluble, a concentration of the polymer was measured by the following method. About 15 mg of a polymer-containing solution was accurately measured and heated from 25° C. to 300° C. at a rate of 20° C./min using a thermal mass spectrometer (Trade name: EXSTAR 6000 manufactured by SII NanoTechnology Inc.), and at that point of time, the residual solid content was measured as a mass of the polymer. The mass of the polymer was divided by the mass of the polymer-containing solution to calculate a concentration of the polymer (% by mass) in percentages.

If the polymer is completely coagulated in water, a concentration of the polymer was measured by the following method. 5 g of the polymer-containing solution was processed for 30 minutes with 1 L of water. This process was repeated three times to collect solid components only, which were dried at a temperature of 120° C. for 1 hour to separate the polymer. The mass of the polymer was measured, and the mass of the polymer was divided by the mass of the polymer-containing solution to calculate a concentration of the polymer (% by mass) in percentages.

<Sulfur Content>

A sulfur content was measured using an elemental analyzer (Trade name: vario EL cube manufactured by Nihon SiberHegner K.K.). As measurement conditions, a temperature of a combustion pipe was 1150° C., a temperature of a reduction pipe was 850° C., and a measurement mode was a CHNS mode. Further, as a standard reagent, sulfanilic acid (C: 41.61%, H: 4.07%, N: 8.09%, S: 18.50%) was used.

<Viscosities of Partially Cyclized Polymer-Containing Solution and Flame-Resistant Polymer-Containing Solution>

The viscosities were measured using a cone/plate rheometer (Trade name: AR550 manufactured by TA Instruments). The measurement was carried out through 25° C. to 150° C. and a value at 25° C. was taken as the representative value.

<Single Fiber Tensile Test for Various Fibers>

A tensile test was carried out in accordance with JIS L1015 (1981). 2.5 mm of both ends of a single fiber having a length of 25 mm were fixed with an adhesive to a slip of paper with smooth and glossy surface in a state where the single fiber was loosely spread, so that the other portion of the single fiber which was not fixed with the adhesive had a length (sample length) of about 20 mm. This was used as a sample of a single fiber tensile tester. The sample was fixed to grips of the single fiber tensile tester, and near the upper grip, the single fiber was not cut but the slip of paper was cut with scissors and measured at a tensile speed of 20 mm/minute. The measurement was carried out 50 times and the average value was taken as a result of the tensile test.

<Specific Gravity Measurement>

A specific gravity was measured in accordance with JIS R 7603.

<Carbonization Yield Measurement>

A simultaneous thermogravimetric differential thermal analyzer EXSTAR 6000 manufactured by Seiko Instruments Inc. was used. Further, a fiber was cut with scissors and a mortar and measured with a mass of 10 mg in a nitrogen atmosphere of 400 mL/min at a temperature increasing rate of 40° C./min. A material of a sample pan was platinum, and a reference material was α-alumina.

In Examples, after the sample underwent a reaction at a predetermined temperature (300° C. or less), the sample was referred to as "Before sample", and when the sample was increase in temperature to 970° C., the sample was referred to as "After sample". A carbonization yield was calculated from the following formula using a mass (g) of the Before sample and a mass (g) of the After sample (the mass was measured to three decimal places). Carbonization yield (%)=Mass of After sample (g)/Mass of Before sample (g)×100

<Infrared Spectroscopy Measurement>

A fiber bundle was cut every 1 m, and 10 mm of ends of the respective three fiber bundles were further cut and collected and then cut into fine pieces in a glass bottle. Further, the fine pieces were ground with a mortar so as to prepare a sample in powder form. 1 mg of the sample was weighed and mixed and ground with 200 mg of dried KBr on the mortar. This was pressed with a pressing machine so as to form disk-shaped tablets each having a diameter of 13 mm and a thickness of 0.5 mm. A transmission measurement was carried out with an FT-IR apparatus (Trade name: Magna 860 manufactured by Nicolet). A baseline of a spectrum was determined using image processing software of Stream Essentials Version 1.8 and an area of the spectrum was quantitatively evaluated.

<Solid $^{13}$C-NMR>

Fiber samples cut into about 5 mm were packed into a commercial zirconia MAS rotor having an inner diameter of 5 mm and a length of 6 mm so as to prepare a measurement sample. As an apparatus, an AVANCEII 300 MHz magnet manufactured by Bruker Bio-Spin was used. A 7 mm MAS probe was used as a probe and set such that a fiber axis was perpendicular to a magnetic field.

In a solid $^{13}$C-NMR spectrum, a peak height of the NMR spectrum in a range of 35 to 45 ppm was assumed as $I_a$ and a peak height of the NMR spectrum in a range of 25 to 35 ppm was assumed as $I_b$.

The conditions for measuring solid $^{13}$C-NMR were as follows:

Measurement temperature: 23° C., Pulse sequence: CPTOSS, MAS rotation frequency: 4500 Hz, Decoupling: TPPM, H90° pulse: 4.5 μs, C180° pulse: 8.8 μs, Integration frequency: 1024 times, Contact time: 3 ms.

Example 1

A PAN polymer (number average molecular weight of 190,000) obtained by polymerizing AN/acrylamide/methacrylic acid of 96/3/1 (mass ratio) was dissolved in DMSO so as to prepare a PAN polymer-containing solution. The PAN polymer-containing solution was increased in height to 160° C. When the temperature was constant, thiolate salt prepared from thioglycerol and sodium hydroxide was added and reacted for 60 minutes in a uniform state, thereby obtaining a partially cyclized polymer-containing solution. A viscosity of the partially cyclized polymer-containing solution was 55 poise. Further, a concentration of the polymer was 18%. A polymer coagulated by putting a part of the partially cyclized polymer-containing solution into warm water was separated by filtration and dried at 120° C. Then, a partially cyclized polymer was analyzed. The partially cyclized polymer had $Abs_{2240\pm60}$ of 17%, a sulfur content of 12%, and a number average molecular weight of 197,000.

Further, palladium-carbon powder of 10% by mass was added to the partially cyclized polymer-containing solution and reacted at 160° C. for 120 minutes, thereby obtaining a black flame-resistant polymer-containing solution. In addition, amounts of the respective materials were PAN polymer/DMSO/thiolate salt/palladium-carbon of 10/76/13/1 (mass ratio). A viscosity of the flame-resistant polymer-containing solution was 60 poise at 25° C. Further, a concentration of the polymer was 15%. After insoluble palladium-carbon powder was removed from the flame-resistant polymer-containing solution by pressure filtration, a polymer coagulated by putting a part of a filtrate into warm water was separated by filtration and dried at 120° C. Thus, a flame-resistant polymer was collected. The flame-resistant polymer had $Abs_{2240\pm60}$ of 12%, $Abs_{2940\pm160}$ of 32%, a sulfur content of 10.2% by mass, a number average molecular weight of 196,000, and a specific gravity of 1.30.

The pressure-filtered flame-resistant polymer-containing solution was formed into fiber by wet spinning apparatus. To be specific, the flame-resistant polymer-containing solution was allowed to pass through a sintered filter and discharged from a spinneret including 100 holes each having a hole diameter of 0.05 mm into a mixed solution (DMSO/water=50/50 (volume ratio)) of DMSO of 20° C. and water, thereby obtaining a coagulated thread. Herein, a degree of swelling of the coagulated thread was 230%. Further, by substituting almost all of a solvent in a hot water bath of 100° C. with water, the coagulated thread was drawn to 3 times. Then, an amino silicon oil agent was applied and then dried in a hot air circulation furnace at 220° C. for 3 minutes, thereby obtaining a flame-resistant fiber. The flame-resistant fiber had a flexibility of 5% and a fineness of 1.0 dtex. Further, $I_a/I_b$ measured by solid $^{13}$C-NMR was 1.19.

Further, a flame-resistant fiber bundle obtained from the flame-resistant fiber was pre-carbonized in a nitrogen atmosphere at 300 to 800° C., and then, carbonized in a nitrogen atmosphere at 1500° C. to obtain a carbon fiber bundle. The carbon fiber bundle had a sulfur content of 9%, a tensile modulus of 200 GPa, and a specific gravity of 1.81.

Example 2

A partially cyclized polymer-containing solution and a black flame-resistant polymer-containing solution were obtained in the same manner as Example 1 except that DMF was used as a solvent instead of DMSO.

A viscosity of the partially cyclized polymer-containing solution was 70 poise. Further, a concentration of the polymer was 16%. A partially cyclized polymer had $Abs_{2240\pm60}$ of 20%, a sulfur content of 16%, and a number average molecular weight of 198,000.

A viscosity of the flame-resistant polymer-containing solution was 75 poise at 25° C. Further, a concentration of the polymer was 16%. A flame-resistant polymer had $Abs_{2240\pm60}$ of 13%, $Abs_{2940\pm160}$ of 36%, a sulfur content of 9.5% by mass, a number average molecular weight of 194,000, and a specific gravity of 1.31.

Then, a coagulated thread, a flame-resistant fiber, a flame-resistant fiber bundle, and a carbon fiber bundle were obtained in the same manner as Example 1 except that a mixed solution (DMF/water=50/50 (volume ratio)) of DMF and water was used instated of the mixed solution of DMSO and water when the flame-resistant polymer-containing solution was formed into fiber. A degree of swelling of the coagulated thread was 250%. The flame-resistant fiber had a flexibility of 6% and a fineness of 1.1 dtex. Further, the carbon fiber bundle had a sulfur content of 8%, a tensile modulus of 210 GPa, and a specific gravity of 1.80.

Example 3

A partially cyclized polymer-containing solution and a black flame-resistant polymer-containing solution were obtained in the same manner as Example 2 except that amounts of the respective materials were PAN polymer/DMF/thiolate salt/palladium-carbon of 10/85/4/1 (mass ratio).

A viscosity of the partially cyclized polymer-containing solution was 82 poise. Further, a concentration of the polymer was 12%. A partially cyclized polymer had $Abs_{2240\pm60}$ of 40%, a sulfur content of 3.5%, and a number average molecular weight of 191,000.

A viscosity of the flame-resistant polymer-containing solution was 90 poise at 25° C. Further, a concentration of the polymer was 12%. A flame-resistant polymer had $Abs_{2240\pm60}$ of 22%, $Abs_{2940\pm160}$ of 45%, a sulfur content of 2.8% by mass, a number average molecular weight of 190,600, and a specific gravity of 1.27.

Then, a coagulated thread, a flame-resistant fiber, a flame-resistant fiber bundle, and a carbon fiber bundle were obtained in the same manner as Example 2. A degree of swelling of the coagulated thread was 190%. The flame-resistant fiber had a flexibility of 4% and a fineness of 1.1 dtex. Further, the carbon fiber bundle had a sulfur content of 2%, a tensile modulus of 190 GPa, and a specific gravity of 1.81.

Example 4

A partially cyclized polymer-containing solution and a black flame-resistant polymer-containing solution were obtained in the same manner as Example 2 except that a reaction temperature was 120° C.

A viscosity of the partially cyclized polymer-containing solution was 80 poise. Further, a concentration of the polymer was 14%. A partially cyclized polymer had $Abs_{2240\pm60}$ of 30%, a sulfur content of 6.1%, and a number average molecular weight of 193,000.

A viscosity of the flame-resistant polymer-containing solution was 92 poise at 25° C. Further, a concentration of the polymer was 14%. A flame-resistant polymer had $Abs_{2240\pm60}$ of 23%, $Abs_{2940\pm160}$ of 49%, a sulfur content of 10.8% by mass, a number average molecular weight of 193,000, and a specific gravity of 1.30.

Then, a coagulated thread, a flame-resistant fiber, a flame-resistant fiber bundle, and a carbon fiber bundle were obtained in the same manner as Example 2. A degree of swelling of the coagulated thread was 240%. The flame-resistant fiber had a flexibility of 4% and a fineness of 1.1 dtex. Further, the carbon fiber bundle had a sulfur content of 9%, a tensile modulus of 200 GPa, and a specific gravity of 1.80.

Example 5

A partially cyclized polymer-containing solution and a black flame-resistant polymer-containing solution were obtained in the same manner as Example 2 except that a PAN polymer (number average molecular weight of 191,000) formed of 100% AN was used.

A viscosity of the partially cyclized polymer-containing solution was 68 poise. Further, a concentration of the polymer was 16%. A partially cyclized polymer had $Abs_{2240\pm60}$ of 22%, a sulfur content of 19%, and a number average molecular weight of 196,000.

A viscosity of the flame-resistant polymer-containing solution was 80 poise at 25° C. Further, a concentration of the polymer was 18%. A flame-resistant polymer had $Abs_{2240\pm60}$ of 11%, $Abs_{2940\pm160}$ of 33%, a sulfur content of 11.5% by mass, a number average molecular weight of 194,000, and a specific gravity of 1.33.

Then, a coagulated thread, a flame-resistant fiber, a flame-resistant fiber bundle, and a carbon fiber bundle were obtained in the same manner as Example 2. A degree of swelling of the coagulated thread was 200%. The flame-resistant fiber had a flexibility of 6% and a fineness of 1.3 dtex. Further, the carbon fiber bundle had a sulfur content of 3%, a tensile modulus of 210 GPa, and a specific gravity of 1.83.

Comparative Example 1

A partially cyclized polymer-containing solution and a black flame-resistant polymer-containing solution were obtained in the same manner as Example 1 except that monoethanolamine (MEA) was used instead of thiolate salt and ortho-nitrotoluen (ONT) was used instead of palladium-carbon powder, and, thus, amounts of the respective materials were PAN/DMSO/MEA/ONT of 10/78/6/6 (mass ratio).

A viscosity of the partially cyclized polymer-containing solution was 0.4 poise. Further, a concentration of the polymer was 11%. A partially cyclized polymer had $Abs_{2240\pm60}$ of 32%, a sulfur content of 0.02%, and a number average molecular weight of 5,600.

A viscosity of the flame-resistant polymer-containing solution was 1 poise at 25° C. Further, a concentration of the polymer was 15%. A flame-resistant polymer had $Abs_{2240\pm60}$ of 20%, $Abs_{2940\pm160}$ of 40%, a sulfur content of 0.01%, a number average molecular weight of 5,500, and a specific gravity of 1.30.

Then, a coagulated thread was obtained in the same manner as Example 1. A degree of swelling of the coagulated thread was 240%. There was an attempt to draw the coagulated thread to 3 times by substituting almost all of a solvent in a hot water bath of 100° C. with water, but the coagulated thread was not drawn and a fiber was broken. Thus, a flame-resistant fiber could not be obtained.

Comparative Example 2

A partially cyclized polymer-containing solution and a black flame-resistant polymer-containing solution were obtained in the same manner as Example 2 except that monoethanolamine (MEA) was used instead of thiolate salt and ortho-nitrotoluen (ONT) was used instead of palladium-carbon powder, and, thus, amounts of the respective materials were PAN/DMF/MEA/ONT of 10/78/6/6 (mass ratio).

A viscosity of the partially cyclized polymer-containing solution was 4 poise. Further, a concentration of the polymer was 12%. A partially cyclized polymer had $Abs_{2240\pm60}$ of 35%, a sulfur content of 0.02%, and a number average molecular weight of 6,300.

A viscosity of the flame-resistant polymer-containing solution was 6 poise at 25° C. Further, a concentration of the polymer was 14.2%. A flame-resistant polymer had $Abs_{2240\pm60}$ of 23%, $Abs_{2940\pm160}$ of 42%, a sulfur content of 0.01%, a number average molecular weight of 6,200, and a specific gravity of 1.32.

Then, a coagulated thread was obtained in the same manner as Example 2. A degree of swelling of the coagulated thread was 207%. There was an attempt to draw the coagulated thread to 3 times by substituting almost all of a solvent in a hot water bath of 100° C. with water, but the coagulated thread was not drawn and a fiber was broken. Thus, a flame-resistant fiber could not be obtained.

Comparative Example 3

A partially cyclized polymer-containing solution and a black flame-resistant polymer-containing solution were obtained in the same manner as Example 5 except that monoethanolamine (MEA) was used instead of thiolate salt and ortho-nitrotoluen (ONT) was used instead of palladium-carbon powder, and, thus, amounts of the respective materials were PAN/DMF/MEA/ONT of 13/78/3/6 (mass ratio).

A viscosity of the partially cyclized polymer-containing solution was 9 poise. Further, a concentration of the polymer was 15%. A partially cyclized polymer had $Abs_{2240\pm60}$ of 78%, a sulfur content of 0%, and a number average molecular weight of 23,000.

A viscosity of the flame-resistant polymer-containing solution was 9 poise at 25° C. Further, a concentration of the polymer was 15.0%. A flame-resistant polymer had $Abs_{2240\pm60}$ of 56%, $Abs_{2940\pm160}$ of 55%, a sulfur content of 0%, a number average molecular weight of 8,400, and a specific gravity of 1.22.

Then, a coagulated thread was obtained in the same manner as Example 5. A degree of swelling of the coagulated thread was 170%. There was an attempt to draw the coagulated thread to 3 times by substituting almost all of a solvent in a hot water bath of 100° C. with water, but the coagulated thread was not drawn and a fiber was broken. Thus, a flame-resistant fiber could not be obtained.

Comparative Example 4

A partially cyclized polymer-containing solution and a black flame-resistant polymer-containing solution were obtained in the same manner as Example 5 except that monoethanolamine (MEA) was used instead of thiolate salt and ortho-nitrotoluen (ONT) was used instead of palladium-carbon powder, and, thus, amounts of the respective materials were PAN/DMF/MEA/ONT of 13/78/6/3 (mass ratio).

A viscosity of the partially cyclized polymer-containing solution was 2 poise. Further, a concentration of the polymer was 13%. A partially cyclized polymer had $Abs_{2240\pm60}$ of 32%, a sulfur content of 0%, and a number average molecular weight of 6,000.

A viscosity of the flame-resistant polymer-containing solution was 7 poise at 25° C. Further, a concentration of the polymer was 15.0%. A flame-resistant polymer had $Abs_{2240\pm60}$ of 20%, $Abs_{2940\pm160}$ of 84%, a sulfur content of 0%, a number average molecular weight of 5,800, and a specific gravity of 1.24.

Then, a coagulated thread was obtained in the same manner as Example 5. A degree of swelling of the coagulated thread was 210%. There was an attempt to draw the coagulated thread to 3 times by substituting almost all of a solvent in a hot water bath of 100° C. with water, but the coagulated thread was not drawn and a fiber was broken. Thus, a flame-resistant fiber could not be obtained.

Comparative Example 5

A partially cyclized polymer-containing solution and a black flame-resistant polymer-containing solution were obtained in the same manner as Example 2 except that amounts of the respective materials were PAN polymer/DMF/thiolate salt/palladium-carbon of 10/69/20/1 (mass ratio).

A viscosity of the partially cyclized polymer-containing solution was 50 poise. Further, a concentration of the polymer was 22%. A partially cyclized polymer had $Abs_{2240\pm60}$ of 8%, a sulfur content of 22%, and a number average molecular weight of 206,000.

A viscosity of the flame-resistant polymer-containing solution was 64 poise at 25° C. Further, a concentration of the polymer was 20%. A flame-resistant polymer had $Abs_{2240\pm60}$ of 5%, $Abs_{2940\pm160}$ of 27%, a sulfur content of 26% by mass, a number average molecular weight of 194,000, and a specific gravity of 1.38.

Then, a coagulated thread, a flame-resistant fiber, a flame-resistant fiber bundle, and a carbon fiber bundle were obtained in the same manner as Example 2. However, it could be observed that a gas such as sulfuric trioxide or thiazole ring-based gas was generated in a carbonization process. A degree of swelling of the coagulated thread was 250%. The flame-resistant fiber had a flexibility of 6% and a fineness of 1.4 dtex. Further, the carbon fiber bundle had a sulfur content of 6%, a tensile modulus of 150 GPa, and a specific gravity of 1.80.

Example 6

A PAN copolymer (number average molecular weight of 190,000) obtained by polymerizing AN/acrylamide (AAM)/methacrylic acid (MAA) of 96/3/1 (mass ratio) was dissolved in dimethylacetamide (DMAc) so as to prepare a spinning dope having a concentration of 20% by mass.

While being maintained at 40° C., the spinning dope was introduced and coagulated in a coagulation bath (an aqueous solution having a DMAc concentration of 50 volume %) controlled to 30° C. using a thread-forming spinneret including 3,000 holes each having a diameter of 0.15 mm by wet spinning method so as to form a line of threads.

After being washed, the line of coagulated threads was drawn to 3.5 times in warns water and an amino-modified silicon-based silicon oil agent was applied, thereby obtaining an drawn thread.

The drawn thread was dried and densified using a heating roller of 160° C. and then drawn to have a total draw ratio of 13 times in increased pressure steam of 0.3 MPa-G, so that a PAN precursor fiber having a single fiber fineness of 1.5 dtex and 3,000 single fibers was obtained. The obtained PAN precursor fiber was immersed in a solution formed of the following components and degenerated into a flame-resistant fiber at 200° C. for 30 seconds. FIG. 1 illustrates infrared absorption spectra before and after (flame-resistant fiber) a PAN precursor fiber is degenerated with thiolate.

| Solvent: | ethylene glycol | 100 parts by mass |
|---|---|---|
| Thiolate compound: | sodium-2,3-dihydroxypropanethiolate | 10 parts by mass |

The flame-resistant fiber was increased in temperature from 300° C. to 1000° C. at a temperature increasing rate of 500° C./min in an inert atmosphere, and then, carbonized at the highest temperature of 1450° C. in an inert atmosphere, thereby obtaining a carbon fiber. The characteristics of the obtained flame-resistant fiber and carbon fiber were measured according to the above-described methods. The experimental conditions were as shown in Table 2, and the measurement results were as shown in Table 4 and Table 6.

The preparation conditions for the respective examples after Example 6 and after Comparative Example 6 were as shown in Table 3 and Table 4, and the characteristics of the obtained flame-resistant fibers and carbon fibers were as shown in Table 5 to Table 7. The abbreviations of the reagents used in Table 2 to Table 6 were as follows. In the following table, AAM represents acrylamide and MAA represents methacrylic acid.

| Abbreviation | |
|---|---|
| PAN homopolymer | AN homopolymer (Number average molecular weight 200,000) |
| PAN copolymer | AN/AAM/MAA = 96/3/1 (Mass ratio) (Number average molecular weight = 190,000) |
| Thiolate A | Sodium-2,3-dihydroxypropanethiolate |
| Thiolate B | Sodium-2-hydroxyethanethiolate |
| Thiolate C | Potassium-2-hydroxyethanethiolate |
| Thiolate D | Sodium-4-hydroxybenzenethiolate |
| Thiolate E | Magnesium bis-2-hydroxyethanethiolate |
| Oxidizer a | Nitrobenzene |
| Oxidizer b | Ortho-nitrotoluene |
| Oxidizer c | N-hydroxyphthalimide |
| Thiol A | α-thioglycerol |

Examples 7 to 11

Flame-retardant fibers and carbon fibers were obtained in the same manner as Example 6 except that a reaction time was as described in Table 1 (1 to 120 minutes), and the properties thereof were evaluated. The experimental conditions were as shown in Table 2 and the measurement results were as shown in Table 4 and Table 6.

Comparative Example 6

A flame-resistant fiber and a carbon fiber were obtained in the same manner as Example 10 except that a thiolate compound and an oxidizing agent were not used, and the properties thereof were evaluated. The experimental conditions were as shown in Table 2 and the measurement results were as shown in Table 4 and Table 6.

Comparative Example 7

A flame-resistant fiber and a carbon fiber were obtained in the same manner as Example 10 except that only a thiolate compound was not used, and the properties thereof were evaluated. The experimental conditions were as shown in Table 2 and the measurement results were as shown in Table 4 and Table 6.

Comparative Example 8

A flame-resistant fiber and a carbon fiber were obtained in the same manner as Example 3 except that monoethanolamine was used instead of a thiolate compound, and the properties thereof were evaluated. The experimental conditions were as shown in Table 2 and the measurement results were as shown in Table 4 and Table 6.

Example 12

A flame-resistant fiber and a carbon fiber were obtained in the same manner as Example 6 except that a PAN homopolymer was used as a PAN polymer, a reaction temperature was 120° C., a reaction time was 40 minutes, and nitrobenzene was used as an oxidizing agent, and the properties thereof were evaluated. The experimental conditions were as shown in Table 3 and the measurement results were as shown in Table 5 and Table 6.

Example 13

A flame-resistant fiber and a carbon fiber were obtained in the same manner as Example 12 except that a reaction temperature was 150° C. and a reaction time was 20 minutes, and the properties thereof were evaluated. The experimental conditions were as shown in Table 3 and the measurement results were as shown in Table 4.

Example 14

A flame-resistant fiber and a carbon fiber were obtained in the same manner as Example 12 except that sodium-2-hydroxyethanethiolate was used as a thiolate compound, ortho-nitrobenzene was used as an oxidizing agent, a reaction temperature was 198° C., and a reaction time was 5 minutes, and the properties thereof were evaluated. The experimental conditions were as shown in Table 3 and the measurement results were as shown in Table 4 and Table 6.

Example 15

A flame-resistant fiber and a carbon fiber were obtained in the same manner as Example 14 except that potassium-2-hydroxyethanethiolate was used as a thiolate compound, and the properties thereof were evaluated. The experimental conditions were as shown in Table 3 and the measurement results were as shown in Table 5.

Example 16

A flame-resistant fiber and a carbon fiber were obtained in the same manner as Example 13 except that sodium-4-hydroxybenzenethiolate was used as a thiolate compound and ortho-nitrotoluen was used as an oxidizing agent, and the properties thereof were evaluated. The experimental conditions were as shown in Table 3 and the measurement results were as shown in Table 5 and Table 6.

Example 17

A flame-resistant fiber and a carbon fiber were obtained in the same manner as Example 16 except that magnesium bis-2-hydroxyethanethiolate was used as a thiolate compound and a blending quantity was as described in Table 3, and the properties thereof were evaluated. The experimental conditions were as shown in Table 3 and the measurement results were as shown in Table 5 and Table 6.

Example 18

A flame-resistant fiber and a carbon fiber were obtained in the same manner as Example 12 except that glycerin was used as a solvent, ortho-nitrotoluen was used as an oxidizing agent, blending quantities of a thiolate compound and the oxidizing agent were as described in Table 3, a reaction temperature was 198° C., and a reaction time was 0.5 minutes and the properties thereof were evaluated. The experimental conditions were as shown in Table 3 and the measurement results were as shown in Table 5 and Table 6.

Example 19

A flame-resistant fiber and a carbon fiber were obtained in the same manner as Example 18 except that ethylene glycol was used as a solvent, blending quantities of a thiolate compound and an oxidizing agent were as described in Table 3, and a reaction time was 1.0 minutes and the properties thereof were evaluated. The experimental conditions were as shown in Table 3 and Table 6 and the measurement results were as shown in Table 5.

Example 20

A flame-resistant fiber and a carbon fiber were obtained in the same manner as Example 19 except that an oxidizing agent was not used and a reaction time was 120 minutes and the properties thereof were evaluated. The experimental conditions were as shown in Table 3 and Table 6 and the measurement results were as shown in Table 5.

Comparative Example 9

A flame-resistant fiber and a carbon fiber were obtained in the same manner as Example 14 except that guanidine carbonate was used instead of a thiolate compound and N-hydroxyphthalimide was used as an oxidizing agent and the properties thereof were evaluated. The experimental conditions were as shown in Table 3 and the measurement results were as shown in Table 4 and Table 6.

Comparative Example 10

A flame-resistant fiber and a carbon fiber were obtained in the same manner as Example 12 except that glycerin was used as a solvent, a thiolate compound and an oxidizing agent were not used, a reaction temperature was 240° C., and a reaction time was 120 minutes and the properties thereof were evaluated. The experimental conditions were as shown in Table 3 and Table 6 and the measurement results were as shown in Table 5.

Comparative Example 11

A flame-resistant fiber and a carbon fiber were obtained in a condition that the PAN precursor fiber used in Example 12 was used and a solvent, a thiolate compound, and an oxidizing agent were not used, that is, a heating process was carried out in air at a reaction temperature of 200° C. for 120 minutes and the properties thereof were evaluated. The experimental conditions were as shown in Table 3 and the measurement results were as shown in Table 5 and Table 6.

Example 21

A flame-resistant fiber and a carbon fiber were obtained in the same manner as Example 8 except that water was used as a solvent, nitrocatechol was used an oxidizing agent, a temperature was 200° C., and a pressure was 1.55 MPa and the properties thereof were evaluated. When the pressure was 1.55 MPa, a commercial autoclave was used. The experimental conditions were as shown in Table 7 and the measurement results were as shown in Table 8 and Table 9.

Example 22

A flame-resistant fiber and a carbon fiber were obtained in the same manner as Example 21 except that a reaction time was 30 minutes and the properties thereof were evaluated. The experimental conditions were as shown in Table 7 and the measurement results were as shown in Table 8 and Table 9.

Example 23

A flame-resistant fiber and a carbon fiber were obtained in the same manner as Example 21 except that a reaction time was 60 minutes and the properties thereof were evaluated. The experimental conditions were as shown in Table 7 and the measurement results were as shown in Table 8 and Table 9.

Comparative Example 12

Comparative Example 12 was carried out in the same manner as Example 22 except that a thiolate compound and an oxidizing agent were not use and the properties thereof were evaluated. However, fibers were bonded to each other during the reaction, and, thus, a fiber form could not be maintained. The experimental conditions were as shown in Table 7 and the measurement results were as shown in Table 8 and Table 9.

Comparative Example 13

Comparative Example 13 was carried out in the same manner as Example 1 except that thiol A(α-thioglycerol) was used instead of thiolate salt and ortho-nitrotoluen (ONT) was used instead of palladium-carbon powder, and, thus, amounts of the respective materials were PAN/DMSO/ thiol A/ONT of 10/75/10/5 (mass ratio). After the process, a part of a black reaction solution was immersed again and a polymer was collected. However, a coagulated polymer was white and rarely reacted, so that a partially cyclized polymer and a flame-resistant polymer could not be obtained. In an infrared absorption spectrum of the polymer, $Abs_{2240\pm60}$ was 98%, $Abs_{2940\pm160}$ was 93%, a sulfur content of 0.05% by mass, a number average molecular weight of 190,000, and a specific gravity of 1.17.

Further, a thread-forming process and a drawing process were carried out in the same manner as Example 1, and a pre-carbonization process was carried out at 300 to 800° C. in a nitrogen atmosphere, but a gas was generated in a large amount due to lack of flame retardance and then decomposed, so that a carbon fiber could not be obtained.

Comparative Example 14

Comparative Example 14 was carried out in the same manner as Example 1 except that a PAN polymer was formed of 100% AN, thiol A(α-thioglycerol) was used instead of thiolate salt, and, thus, amounts of the respective materials were PAN/DMSO/thiol A/Pd_C of 10/79/10/1 (mass ratio). After the process, a part of a black reaction solution was immersed again and a polymer was collected. However, a coagulated polymer was white and rarely reacted, so that a partially cyclized polymer and a flame-resistant polymer could not be obtained. In an infrared absorption spectrum of the polymer, $Abs_{2240\pm60}$ was 96%, $Abs_{2940\pm160}$ was 97%, a sulfur content of 0.04% by mass, a number average molecular weight of 190,000, and a specific gravity of 1.17.

Further, a thread-forming process and a drawing process were carried out in the same manner as Example 1, and a pre-carbonization process was carried out at 300 to 800° C. in a nitrogen atmosphere, but a gas was generated in a large amount due to lack of flame retardance and then decomposed, so that a carbon fiber could not be obtained.

Comparative Example 15

Comparative Example 15 was carried out in the same manner as Example 1 except that a PAN polymer was formed of 100% AN, thiol A(α-thioglycerol) was used instead of thiolate salt, and, thus, amounts of the respective materials were PAN/DMAc/thiol A/Pd_C of 10/79/10/1 (mass ratio). After the process, a part of a black reaction solution was immersed again and a polymer was collected. However, a coagulated polymer was white and rarely reacted, so that a partially cyclized polymer and a flame-resistant polymer could not be obtained. In an infrared absorption spectrum of the polymer, $Abs_{2240\pm60}$ was 98%, $Abs_{2940\pm160}$ was 94%, a sulfur content of 0.04% by mass, a number average molecular weight of 190,000, and a specific gravity of 1.18.

Further, a thread-forming process and a drawing process were carried out in the same manner as Example 1, and a pre-carbonization process was carried out at 300 to 800° C. in a nitrogen atmosphere, but a gas was generated in a large amount due to lack of flame retardance and then decomposed, so that a carbon fiber could not be obtained.

TABLE 1

|  | PAN polymer composition (Mass ratio) | PAN/solvent/nucleophilic agent/ Oxidizing agent (Mass ratio) | Reaction temperature (° C.) |
|---|---|---|---|
| Example 1 | AN/AAM/MAA = 96/3/1 | PAN/DMSO/TL/Pd_C = 10/76/13/1 | 160 |
| Example 2 | AN/AAM/MAA = 96/3/1 | PAN/DMF/TL/Pd_C = 10/76/13/1 | 160 |
| Example 3 | AN/AAM/MAA = 96/3/1 | PAN/DMF/TL/Pd_C = 10/85/4/1 | 160 |
| Example 4 | AN/AAM/MAA = 96/3/1 | PAN/DMF/TL/Pd_C = 10/76/13/1 | 120 |
| Example 5 | AN = 100 | PAN/DMF/TL/Pd_C = 10/76/13/1 | 160 |
| Comparative Example 1 | AN/AAM/MAA = 96/3/1 | PAN/DMSO/MEA/ONT = 10/78/6/6 | 160 |
| Comparative Example 2 | AN/AAM/MAA = 96/3/1 | PAN/DMF/MEA/ONT = 10/78/6/6 | 160 |
| Comparative Example 3 | AN = 100 | PAN/DMF/MEA/ONT = 13/78/6/3 | 160 |
| Comparative Example 4 | AN = 100 | PAN/DMF/MEA/ONT = 13/78/3/6 | 160 |
| Comparative Example 5 | AN/AAM/MAA = 96/3/1 | PAN/DMSO/TL/Pd_C = 10/69/20/1 | 160 |

In Table 1, TL represents thiolate salt, and Pd_C represents palladium-carbon.

TABLE 2

|  | PAN polymer | Solvent Ethylene glycol Mass ratio | Thiolate compound Thiolate A Mass ratio | Oxidizing agent O-nitrotoluene Mass ratio | Reaction condition | |
|---|---|---|---|---|---|---|
|  |  |  |  |  | Temperature ° C. | Time Min |
| Example 6 | PAN copolymer | 100 | 10 | 10 | 198 | 0.5 |
| Example 7 | PAN copolymer | 100 | 10 | 10 | 198 | 1 |
| Example 8 | PAN copolymer | 100 | 10 | 10 | 198 | 5 |
| Example 9 | PAN copolymer | 100 | 10 | 10 | 198 | 20 |
| Example 10 | PAN copolymer | 100 | 10 | 10 | 198 | 60 |
| Example 11 | PAN copolymer | 100 | 10 | 10 | 198 | 120 |
| Copmarative Example 6 | PAN copolymer | 100 | 0 | 0 | 198 | 120 |
| Copmarative Example 7 | PAN copolymer | 100 | 0 | 10 | 198 | 120 |
| Copmarative Example 8 | PAN copolymer | 100 | Monoethanolamine 10 | 10 | 198 | 5 |

TABLE 3

|  | PAN polymer | Solvent (Mass ratio) | | Thiolate compound (Mass ratio) | | Oxidizing agent (Mass ratio) | | Reactoin condition | |
|---|---|---|---|---|---|---|---|---|---|
|  |  |  |  |  |  |  |  | Temperature (° C.) | Time (min) |
| Example 12 | PAN homopolymer | Ethylene glycol | 100 | ThiolateA | 10 | Nitrobenzene | 10 | 120 | 40 |
| Example 13 | PAN homopolymer | Ethylene glycol | 100 | ThiolateA | 10 | Nitrobenzene | 10 | 150 | 20 |

TABLE 3-continued

|  | PAN polymer | Solvent (Mass ratio) |  | Thiolate compound (Mass ratio) |  | Oxidizing agent (Mass ratio) |  | Reaction condition Temperature (° C.) | Time (min) |
|---|---|---|---|---|---|---|---|---|---|
| Example 14 | PAN homopolymer | Ethylene glycol | 100 | ThiolateB | 10 | O-nitrotoluene | 10 | 198 | 5.0 |
| Example 15 | PAN homopolymer | Ethylene glycol | 100 | ThiolateC | 10 | O-nitrotoluene | 10 | 198 | 5.0 |
| Example 16 | PAN homopolymer | Ethylene glycol | 100 | ThiolateD | 10 | O-nitrotoluene | 10 | 150 | 20 |
| Example 17 | PAN homopolymer | Ethylene glycol | 100 | ThiolateE | 5 | O-nitrotoluene | 10 | 150 | 20 |
| Example 18 | PAN homopolymer | Glycerine | 100 | ThiolateA | 30 | O-nitrotoluene | 30 | 198 | 0.5 |
| Example 19 | PAN homopolymer | Ethylene glycol | 100 | ThiolateA | 3 | O-nitrotoluene | 3 | 198 | 1.0 |
| Example 20 | PAN homopolymer | Ethylene glycol | 100 | ThiolateA | 10 | None | — | 198 | 120 |
| Comparative Example 9 | PAN homopolymer | Ethylene glycol | 100 | Guanidine carbonate | 10 | N-hydroxyphthalimide | 10 | 198 | 5.0 |
| Comparative Example 10 | PAN homopolymer | Glycerine | 100 | None |  | None |  | 240 | 120 |
| Comparative Example 11 | PAN homopolymer | None | None | None |  | None |  | 200 | 120 |

TABLE 4

|  | Specific gravity (Flame-retardant fiber) | Sulfur content (Flame-retardant fiber) | Carbonization yield (%) | Sulfur content (Carbon fiber) | Tensile strength (GPa) | Tensile modulus (GPa) |
|---|---|---|---|---|---|---|
| Example 6 | 1.25 | 2.2 | 42 | 0.3 | 6.2 | 305 |
| Example 7 | 1.31 | 4.8 | 44 | 0.6 | 6.1 | 310 |
| Example 8 | 1.38 | 6.4 | 45 | 0.9 | 6.3 | 332 |
| Example 9 | 1.39 | 8.6 | 48 | 1.2 | 6.6 | 335 |
| Example 10 | 1.42 | 10.1 | 55 | 1.4 | 6.7 | 344 |
| Example 11 | 1.51 | 11.7 | 58 | 1.6 | 6.9 | 350 |
| Comparative Example 6 | 1.17 | 0.0 | 38 | 0.0 | 4.8 | 270 |
| Comparative Example 7 | 1.18 | 0.0 | 37 | 0.0 | 5 | 277 |
| Comparative Example 8 | 1.21 | 0.0 | 44 | 0.0 | 4.8 | 274 |

TABLE 5

|  | Specific gravity (Flame-retardant fiber) | Sulfur content (Flame-retardant fiber) | Carbonization yield (%) | Sulfur content (Carbon fiber) | Tensile strength (GPa) | Tensile modulus (GPa) |
|---|---|---|---|---|---|---|
| Example 12 | 1.32 | 6.5 | 44 | 0.9 | 6.1 | 312 |
| Example 13 | 1.39 | 6.4 | 47 | 0.9 | 5.9 | 304 |
| Example 14 | 1.38 | 6.7 | 49 | 0.9 | 6.3 | 330 |
| Example 15 | 1.39 | 6.9 | 51 | 0.9 | 6.4 | 328 |
| Example 16 | 1.37 | 4.7 | 46 | 0.6 | 6.2 | 326 |
| Example 17 | 1.37 | 5.2 | 48 | 0.7 | 6.2 | 322 |
| Example 18 | 1.29 | 3.7 | 44 | 0.5 | 6.0 | 303 |
| Example 19 | 1.25 | 2.1 | 41 | 0.3 | 6.2 | 315 |
| Example 20 | 1.26 | 11.8 | 40 | 1.6 | 5.4 | 289 |
| Comparative Example 9 | 1.22 | 0.0 | 36 | 0.0 | 4.9 | 273 |
| Comparative Example 10 | 1.19 | 0.0 | 38 | 0.0 | 4.7 | 269 |
| Comparative Example 11 | 1.18 | 0.0 | 39 | 0.0 | 4.7 | 275 |

TABLE 6

|  | $Abs_{2240\pm60}$ (%) | $Abs_{2940\pm160}$ (%) | $Abs_{2240/2940}$ |
|---|---|---|---|
| Example 1 | 12 | 32 | 0.21 |
| Example 2 | 13 | 36 | 0.22 |
| Example 3 | 22 | 45 | 0.41 |
| Example 4 | 23 | 49 | 0.36 |
| Example 5 | 11 | 33 | 0.20 |
| Comparative Example 1 | 20 | 40 | 0.65 |
| Comparative Example 2 | 23 | 42 | 0.63 |
| Comparative | 56 | 55 | 0.84 |

TABLE 6-continued

|  | Abs$_{2240\pm60}$ (%) | Abs$_{2940\pm160}$ (%) | Abs$_{2240/2940}$ |
|---|---|---|---|
| Example 3 |  |  |  |
| Comparative Example 4 | 20 | 84 | 0.87 |
| Comparative Example 5 | 8 | 22 | 0.62 |
| Example 6 | 58 | 67 | 0.53 |
| Example 7 | 42 | 50 | 0.55 |
| Example 8 | 31 | 37 | 0.52 |
| Example 9 | 23 | 26 | 0.46 |
| Example 10 | 15 | 19 | 0.21 |
| Example 11 | 6 | 10 | 0.18 |
| Comparative Example 6 | 87 | 93 | 1.02 |
| Comparative Example 7 | 89 | 87 | 1.00 |
| Comparative Example 8 | 73 | 75 | 0.74 |
| Example 12 | 33 | 40 | 0.55 |
| Example 13 | 32 | 41 | 0.47 |
| Example 14 | 28 | 38 | 0.42 |
| Example 15 | 34 | 46 | 0.37 |
| Example 19 | 60 | 65 | 0.55 |
| Example 20 | 17 | 67 | 0.52 |
| Comparative Example 10 | 74 | 91 | 0.89 |
| Comparative Example 11 | 73 | 86 | 0.74 |

TABLE 7

|  | PAN polymer | Solvent Water Parts by mass | Thiolate compound Thiolate A Parts by mass | Oxidizing agent Nitrocatechol Parts by mass | Reaction condition Temperature °C. | Pressure Mpa | Time Min |
|---|---|---|---|---|---|---|---|
| Example 21 | PAN copolymer | 100 | 10 | 10 | 200 | 1.55 | 5 |
| Example 22 | PAN copolymer | 100 | 10 | 10 | 200 | 1.55 | 30 |
| Example 23 | PAN copolymer | 100 | 10 | 10 | 200 | 1.55 | 60 |
| Comparative Example 12 | PAN copolymer | 100 | 0 | 0 | 200 | 1.55 | 30 |

TABLE 8

|  | Specific gravity (Flame-retardant fiber) | Sulfur content (Flame-retardant fiber) | Sulfur content (Carbon fiber) | Carbonization yield (%) | Tensile strength (GPa) | Tensile modulus (GPa) |
|---|---|---|---|---|---|---|
| Example 21 | 1.44 | 6.5 | 1.4 | 48 | 5.2 | 303 |
| Example 22 | 1.50 | 8.4 | 1.7 | 50 | 5.1 | 328 |
| Example 23 | 1.52 | 10.2 | 1.8 | 57 | 5.3 | 333 |
| Comparative Example 12 | 1.19 | 0.0 | 0.0 | 38 | (Fiber form cannot be maintained in flame retardation process) | (Fiber form cannot be maintained in flame retardation process) |

TABLE 9

|  | Abs$_{2240\pm60}$ (%) | Abs$_{2940\pm160}$ (%) | Abs$_{2240/2940}$ |
|---|---|---|---|
| Example 21 | 41 | 53 | 0.52 |
| Example 22 | 15 | 18 | 0.43 |
| Example 23 | 7 | 12 | 0.21 |
| Comparative Example 12 | 97 | 95 | 1.04 |

TABLE 10

|  | PAN polymer composition | PAN/solvent/nucleophilic agent/ Oxidizing agent (Mass ratio) | Reaction temperature |
|---|---|---|---|
| Comparative Example 13 | AN/AAM/MAA = 96/3/1 | PAN/DMSO/thiol A/ONT = 10/75/10/5 | 160 |
| Comparative Example 14 | AN = 100 | PAN/DMSO/thiol A/Pd_C = 10/79/10/1 | 160 |
| Comparative Example 15 | AN = 100 | PAN/DMAc/thiol A/Pd_C = 10/79/10/1 | 160 |

TABLE 11

| | $Abs_{2240\pm60}$ (%) | $Abs_{2940\pm160}$ (%) | $Abs_{2240/2940}$ |
|---|---|---|---|
| Comparative Example 13 | 98 | 93 | 0.99 |
| Comparative Example 14 | 96 | 97 | 1.01 |
| Comparative Example 15 | 98 | 94 | 0.92 |

TABLE 12

| | Ia/Ib (Flame-retardant fiber) |
|---|---|
| Example 1 | 1.19 |
| Example 2 | 1.28 |
| Example 3 | 0.92 |
| Example 4 | 1.19 |
| Example 5 | 1.46 |
| Comparative Example 1 | Flame-retardant fiber cannot be obtained |
| Comparative Example 2 | Flame-retardant fiber cannot be obtained |
| Comparative Example 3 | Flame-retardant fiber cannot be obtained |
| Comparative Example 4 | Flame-retardant fiber cannot be obtained |
| Comparative Example 5 | 0.42 |
| Example 6 | 0.74 |
| Example 7 | 1.28 |
| Example 8 | 1.91 |
| Example 9 | 2.01 |
| Example 10 | 2.28 |
| Example 11 | 3.09 |
| Comparative Example 6 | 0.01 |
| Comparative Example 7 | 0.10 |
| Comparative Example 8 | 0.37 |
| Example 12 | 1.37 |
| Example 13 | 2.01 |
| Example 14 | 1.91 |
| Example 15 | 2.01 |
| Example 17 | 1.82 |
| Example 17 | 1.82 |
| Example 18 | 1.10 |
| Example 19 | 0.74 |
| Example 20 | 0.83 |
| Comparative Example 9 | 0.46 |
| Comparative Example 10 | 0.19 |
| Comparative Example 11 | 0.10 |
| Example 21 | 2.46 |
| Example 22 | 3.00 |
| Example 23 | 3.18 |
| Comparative Example 12 | Flame-retardant fiber cannot be obtained |
| Comparative Example 13 | Flame-retardant fiber cannot be obtained |
| Comparative Example 14 | Flame-retardant fiber cannot be obtained |
| Comparative Example 15 | Flame-retardant fiber cannot be obtained |

INDUSTRIAL APPLICABILITY

According to the preparation method of a flame-resistant fiber, it is possible to prepare a high-quality flame-resistant fiber with a high productivity. Further, the flame-resistant fiber of the invention can be widely used for a flame-resistant fiber product.

Further, according to the preparation method of a carbon fiber, it is possible to prepare a high-quality carbon fiber with a high productivity. Further, the carbon fiber of the invention has an excellent mechanical characteristic, and, thus, it is suitable for a reinforced fiber for a fiber reinforced composite material and it is excellent in high-order processability.

The invention claimed is:

1. A process for preparing a polyacrylonitrile flame-resistant fiber mainly composed of a flame-resistant polyacrylonitrile polymer, comprising:
    modifying a polyacrylonitrile polymer with a thiolate compound into the flame-resistant polyacrylonitrile polymer having a specific gravity of 1.24 or more to 1.55.

2. The process for preparing a polyacrylonitrile flame-resistant fiber according to claim 1, wherein the modification is carried out in the presence of an oxidizing agent.

3. The process for preparing a polyacrylonitrile flame-resistant fiber according to claim 2, wherein the modification is carried out in a solution.

4. The process for preparing a polyacrylonitrile flame-resistant fiber according to claim 3, wherein the solution is a non-protonic polar solvent.

5. The process for preparing a polyacrylonitrile flame-resistant fiber according to claim 1, wherein the thiolate compound is selected from the following general formula (1) or (2):

[Chemical Formula 1]

$$M_1\text{-}S\text{—}R_1 \qquad (1)$$

in the formula (1), $M_1$ represents an alkali metal, and $R_1$ is selected from a hydrocarbon group or a hydrocarbon group containing at least one functional group selected from a hydroxy group, an amino group, a nitro group, a thiol group, an imino group, a nitrile group, and an azo group; and

[Chemical Formula 2]

$$R_2\text{—}S\text{-}M_2\text{-}S\text{—}R_3 \qquad (2)$$

in the formula (2), $M_2$ represents an alkali earth metal, $R_2$ and $R_3$ are selected from a hydrocarbon group or a hydrocarbon group containing at least one functional group selected from a hydroxy group, an amino group, a nitro group, a thiol group, an imino group, a nitrile group, and an azo group.

6. The process for preparing a polyacrylonitrile flame-resistant fiber according to claim 2, wherein the oxidizing agent is a compound containing at least one nitrogen atom.

7. A preparation method of a polyacrylonitrile flame-resistant fiber, wherein a compound formed by modifying a polyacrylonitrile polymer with a thiolate compound is mixed and dissolved in a non-protonic polar solvent to prepare a spinning dope, and the polyacrylonitrile flame-resistant fiber is obtained from the spinning dope by way of wet spinning method or dry-wet spinning method.

8. The preparation method of a polyacrylonitrile flame-resistant fiber according to claim 7, wherein the modification is carried out in the presence of an oxidizing agent.

9. The preparation method of a polyacrylonitrile flame-resistant fiber according to claim 7, wherein the thiolate compound is selected from the following general formula (1) or (2):

[Chemical Formula 1]

$$M_1\text{-S}\text{—}R_1 \quad (1)$$

in the formula (1), $M_1$ represents an alkali metal, and $R_1$ is selected from a hydrocarbon group or a hydrocarbon group containing at least one functional group selected from a hydroxy group, an amino group, a nitro group, a thiol group, an imino group, a nitrile group, and an azo group; and

[Chemical Formula 2]

$$R_2\text{—}S\text{-}M_2\text{-}S\text{—}R_3 \quad (2)$$

in the formula (2), $M_2$ represents an alkali earth metal, $R_2$ and $R_3$ are selected from a hydrocarbon group or a hydrocarbon group containing at least one functional group selected from a hydroxy group, an amino group, a nitro group, a thiol group, an imino group, a nitrile group, and an azo group.

10. The preparation method of a polyacrylonitrile flame-resistant fiber according to claim 7, wherein the oxidizing agent is a compound containing at least one nitrogen atom.

11. The preparation method of a polyacrylonitrile flame-resistant fiber according to claim 10, wherein the oxidizing agent contains at least one functional group or structure selected from the group consisting of a nitro group, a nitroso group, an N-hydroxy structure, an N-oxide structure, and an N-oxyl structure.

12. A preparation method of a carbon fiber comprising:
heating a flame-resistant polyacrylonitrile fiber at 300° C. or more to 3000° C. or less,
wherein the flame-resistant polyacrylonitrile fiber includes a compound formed by modifying a polyacrylonitrile polymer with a thiolate compound and having a specific gravity of 1.24or more to 1.55or less, as a main component.

13. The preparation method of a carbon fiber according to claim 12, wherein the flame-resistant polyacrylonitrile fiber is formed by modifying a polyacrylonitrile precursor fiber with a thiolate compound and an oxidizing agent.

14. The preparation method of a carbon fiber according to claim 13, wherein the modification is carried out in a solution.

15. The preparation method of a carbon fiber according to claim 14, wherein the solution is an ethylene glycol-based solvent.

16. The preparation method of a carbon fiber according to claim 12, wherein the thiolate compound is selected from the following general formula (1) or (2):

[Chemical Formula 1]

$$M_1\text{-S}\text{—}R_1 \quad (1)$$

in the formula (1), $M_1$ represents an alkali metal, and $R_1$ is selected from a hydrocarbon group or a hydrocarbon group containing at least one functional group selected from a hydroxy group, an amino group, a nitro group, a thiol group, an imino group, a nitrile group, and an azo group; and

[Chemical Formula 2]

$$R_2\text{—}S\text{-}M_2\text{-}S\text{—}R_3 \quad (2)$$

in the formula (2), $M_2$ represents an alkali earth metal, $R_2$ and $R_3$ are selected from a hydrocarbon group or a hydrocarbon group containing at least one functional group selected from a hydroxy group, an amino group, a nitro group, a thiol group, an imino group, a nitrile group, and an azo group.

17. The preparation method of a carbon fiber according to claim 13, wherein the oxidizing agent is a compound containing at least one nitrogen atom.

18. The preparation method of a carbon fiber according to claim 17, wherein the oxidizing agent contains at least one functional group or structure selected from the group consisting of a nitro group, a nitroso group, an N-hydroxy structure, an N-oxide structure, and an N-oxyl structure.

19. The preparation method of a carbon fiber according to claim 12, wherein the modification is carried out in a solution including a solvent in an amount of 100 parts by mass and a thiolate compound in an amount of 1 part by mass or more to 150 parts by mass or less at 120° C. or more to 250° C. or less for 30 seconds or more to 120 minutes or less.

20. The preparation method of a carbon fiber according to claim 13, wherein the modification is carried out in a solution including a solvent in an amount of 100 parts by mass, a thiolate compound in an amount of 1 part by mass or more to 150 parts by mass or less, and an oxidizing agent in an amount of 1 part by mass or more to 150 parts by mass or less at 120° C. or more to 250° C. or less for 30 seconds or more to 120 minutes or less.

21. The preparation method of a carbon fiber according to claim 12, wherein the flame-resistant polyacrylonitrile fiber has a sulfur content of 0.1% by mass or more to 30% by mass or less.

22. A preparation method of a carbon fiber, wherein a flame-resistant polyacrylonitrile fiber is formed by modifying a polyacrylonitrile precursor fiber with a thiolate compound or a thiolate compound and an oxidizing agent, the flame-resistant polyacrylonitrile fiber has a sulfur content of 0.3% by mass or more to 30.0% by mass or less and a specific gravity of 1.24 or more to 1.55 or less, and $Abs_{2240\pm60}$ calculated from the following formula (3) using an area of an infrared absorption spectrum A measured on the flame-resistant polyacrylonitrile fiber and the polyacrylonitrile precursor fiber by infrared spectroscopy in a range of $2240\pm60$ cm$^{-1}$ is 70% or less:

$$Abs_{2240\pm60}(\%) = \frac{\text{Area of infrared absorption spectrum } (A) \text{ of flame-retardant fiber}}{\text{Area of infrared absorption spectrum } (A) \text{ of polyacrylonitrile precursor fiber}} \times 100 \quad (3)$$

23. The preparation method of a carbon fiber according to claim 14, wherein the modification is carried out in an aqueous solvent.

24. The preparation method of a carbon fiber according to claim 23, wherein the modification is carried out at a temperature of 120° C. or more to 250° C. or less at a pressure of 0.18 MPa or more to 3.98 MPa or less for 30 seconds or more to 120 minutes or less.

25. The preparation method of a carbon fiber according to claim 24, wherein the modification is carried out such that a flame-resistant polyacrylonitrile fiber has a specific gravity of 1.24 or more 1.55 or less, and a sulfur content of 0.1% by mass or more to 30% by mass or less.

* * * * *